United States Patent [19]

Klabunde

[11] Patent Number: 5,990,373

[45] Date of Patent: Nov. 23, 1999

[54] NANOMETER SIZED METAL OXIDE PARTICLES FOR AMBIENT TEMPERATURE ADSORPTION OF TOXIC CHEMICALS

[75] Inventor: Kenneth J. Klabunde, Manhattan, Kans.

[73] Assignee: Kansas State University Research Foundation, Manhattan, Kans.

[21] Appl. No.: 08/914,632

[22] Filed: Aug. 19, 1997

Related U.S. Application Data

[63] Continuation-in-part of application No. 08/700,221, Aug. 20, 1996, abandoned.

[51] Int. Cl.$^6$ ........................................................ A62D 3/00
[52] U.S. Cl. ........................... 588/200; 588/205; 588/218; 588/221; 588/224; 588/236; 588/242; 588/246; 423/210; 423/244.01; 423/245.1
[58] Field of Search .................................. 423/210, 239.1, 423/244.01, 244.06, 244.07, 245.1; 588/200, 205, 218, 221, 224, 236, 242, 246

[56] References Cited

U.S. PATENT DOCUMENTS

| 4,201,751 | 5/1980 | Holter et al. | 423/210 |
|---|---|---|---|
| 4,539,188 | 9/1985 | Hirsch et al. | 423/210 |
| 4,548,797 | 10/1985 | Sauer et al. | 423/240 |
| 4,582,613 | 4/1986 | Kenney et al. | 210/761 |
| 5,352,425 | 10/1994 | Rodriguez et al. | 423/244.07 |
| 5,547,649 | 8/1996 | Beck et al. | 423/230 |
| 5,648,591 | 7/1997 | Donecker et al. | 588/205 |
| 5,750,084 | 5/1998 | Tsutsumi et al. | 423/239.1 |

OTHER PUBLICATIONS

Klabunde et al.; Nanoscale Metal Oxides as Destructive Adsorbents. New Surface Chemistry and Environmental Applications; *Fine Particles Science and Technology*, 691–706 (1996).

Klabunde et al.; Overlayer of Iron Oxide on Nanoscale Magnesium Oxide Crystallites; *High Temperature and Materials Science*; 33:99–106 (1995).

Utamapanya et al.; Nanoscale Metal Oxide Particles/Clusters as Chemical Reagents. Synthesis and Properties of Ultrahigh Surface Area Magnesium Hydroxide and Magnesium Oxide; *Chem. Mater.*, 3:175–181 (1991).

Koper et al.; Destructive Adsorption of Chlorinated Hydrocarbons on Ultrafine (Nanoscale) Particles of Calcium Oxide; *Chem. Mater.*, 5:500–505 (1993).

Ekerdt et al.; Surface Chemistry of Organophosphorus Compounds; *J. Phys. Chem.*, 92:6182–6188 (1988).

Klabunde et al.; Nanocrystals as Stoichiometric Reagents with Unique Surface Chemistry; *J. Phys. Chem.*, 100:12142–12153 (1996).

Li et al.; Destructive Adsorption of Chlorinated Benzenes on Ultrafine (Nanoscale) Particles of Magnesium Oxide and Calcium Oxide; *Environ. Sci. Technol.* 28:1248–1253 (1994).

Li et al.; Adsorption and Decomposition of Organophosphorus Compounds on Nanoscale Metal Oxide Particles. In Situ GC–MS Studies of Pulsed Microreactions over Magnesium Oxide; *Chem. Mater.* 4:323–330 (1992).

Lin et al.; Thermally Activated magnesium Oxide Surface Chemistry. Adsorption and Decomposition of Phosphorus Compounds; *Langmuir*, 1:600–605 (1985).

*Primary Examiner*—Gary P. Straub
*Assistant Examiner*—Timothy C. Vandy
*Attorney, Agent, or Firm*—Hovey, Williams, Timmons & Collins

[57] ABSTRACT

Methods for adsorbing toxic target chemical compounds such as HCN, $P(O)(OCH_2CH_3)(CN)(N(CH_3)_2)$, ClCN, $(CF_3)_2C=CF_2$, $Zn(CH_2CH_3)_2$, $Hg(CH_3)_2$, $Fe(CO)_5$, $(P)(O)(CH_3)(F)[OCH(CH_3)_2]$, $S(CH_2CH_2Cl)_2$, $C_6H_5C(O)CH_2Cl$, $C(O)Cl_2$, $C_6Cl_5OH$, $C_6H_3(OH)(NO_2)_3$, $C_6H_5(Br)(CN)$, $C_6H_5CH_2CN$ and $(CF_3)C=CF_2$ are provided wherein such compounds (either as gases, liquids or solids) are contacted with nanoscale oxide adsorbents, such as MgO and CaO, preferably at a temperature in the range of −70 to 90° C. and at atmospheric pressure. The preferred adsorbents have an average particle size of from about 1–20 nm, and have a total pore volume of at least about 0.5 cc/g.

43 Claims, 12 Drawing Sheets

5,990,373

NANOMETER SIZED METAL OXIDE PARTICLES FOR AMBIENT TEMPERATURE ADSORPTION OF TOXIC CHEMICALS

RELATED APPLICATION

This is a continuation-in-part of application Ser. No. 08/700,221, filed Aug. 20, 1996 now abandoned.

FEDERALLY SPONSORED RESEARCH/ DEVELOPMENT PROGRAM

This invention was made with government support under Grant DAAH04-93-G-0328 awarded by the United States Army Research Office. The government has certain rights in the invention.

BACKGROUND OF THE INVENTION

1. Field of the Invention

The present invention is broadly concerned with improved techniques for the adsorption of target compounds through use of finely divided adsorbents selected from the group consisting of MgO, CaO, $TiO_2$, $ZrO_2$, $Fe_2O_3$, NiO, CuO, $Al_2O_3$, ZnO and mixtures thereof. The most preferred adsorbents of the invention are prepared by aerogel methods and have an average particle size of from about 1–20 nm. In the method, target compound(s) are contacted with the adsorbent to destructively adsorb or chemisorb the target compound(s). In particularly preferred forms, the adsorption reaction may be carried out at ambient temperatures and at atmospheric pressures.

2. Description of the Prior Art

In recent years, the scientific community and the public at large have expressed increasing concern about the effect of toxic chemicals on the environment. Spills of liquid chemicals or the inadvertent release of gaseous pollutants can create extreme environmental hazards which must be effectively cleaned up and controlled. To give another example, several million tons of phosphorous nerve agents exist in the United States, and investigations are under way to find safe, effective measures to detoxify these chemicals without endangering human life or the environment.

Technology currently in use includes activated carbon adsorbents (black powders) and/or highly caustic solutions. Activated carbon suffers from the fact that it does not destroy a toxic chemical but merely "holds it" by adsorption forces (i.e., chemisorption). Moreover, inorganic pollutants such as hydrogen cyanide, cyanogen chloride and acid gases are not adsorbed well by activated carbon. Finally, activated carbon is difficult to clean up. Caustic wash solutions create problems because of their tendency to corrode and degrade metals, paint and wood. Moreover, these solutions are inherently heavy and very dangerous to handle.

It has been suggested in the past to employ ultrafine (nanoscale) particles of MgO or CaO for the destructive adsorption of chlorinated benzenes, Li et al., *Environmental Science & Technology*, 28:1248–1253 (1994). In this paper, high temperature destructive adsorption of chloroarenes was facilitated by the presence of the nanoscale oxides. Similarly, Koper et al., *Chem. Mater.*, 5:500–505 (1993) described the destructive adsorption of chlorinated hydrocarbons at high temperatures using nanoscale CaO. Finally, Klabunde et al., *High Temp. Mater. Sci.*, 33:99–106 (1995) advocates the destructive adsorption of chlorocarbons at high temperature through use of $MgO/Fe_2O_3$ composites.

Lin et al. (*Langmuir*, Vol. 1, No. 5, pp.600–605, 1985) describe the use of MgO and CaO for adsorbing organophosphorous compounds at subatmospheric pressures. The paper also reported destructive adsorption of certain compounds at temperatures of 100° C. and above. There is no teaching in this reference of adsorption at atmospheric pressures or above, nor any suggestion that destructive adsorption can occur at lower temperatures.

Li et al. (*Chem. Mater.*, Vol. 4, No. 2, pp. 323–330, 1992) describes the high temperature destructive adsorption of organophosphorous compounds using nanoparticle MgO and CaO. The lowest effective destructive adsorption temperature described in this reference is 170° C., with best results being achieved at temperatures of 700–900° C.

These prior techniques all generally require relatively high reaction temperatures which consequently limits the utility of the adsorbence reactions. Moreover, there are a large number of potentially troublesome toxic materials such as nerve gases which are not addressed by these prior methods. There is accordingly a need in the art for improved adsorbent methods having broad applicability to a wide variety of target compounds and which can be carried out at relatively low and even room temperatures.

SUMMARY OF THE INVENTION

The present invention relates to improved methods for the adsorbence of a wide variety of target compounds. To this end, the invention contemplates use of finely divided nanoscale adsorbents selected from the group consisting of MgO, CaO, $TiO_2$, $ZrO_2$, $Fe_2O_3$, NiO, CuO, $Al_2O_3$, ZnO and mixtures thereof. The adsorbence reactions of the invention can be carried out over a wide temperature range, and the target compounds can be in the form of fluids (i.e., gases or liquids) or solids. Thus, the invention achieves utilities not possible with prior techniques.

Although excellent results have been obtained using the aforementioned oxides per se, (i.e., the adsorbents of the invention consist essentially of these oxides without any further chemical or other modifications), the invention is not so limited. Thus, the oxides may be coated or doped in order to alter the acidic or basic properties thereof by contacting the oxides with an acid or base (e.g., an organic or inorganic acid or base).

In more detail, the adsorbents of the invention should have an average particle size of from about 1–20 nm, or preferably from about 2–15 nm. As is conventional in the art, the term "particles" is used herein interchangeably with the term "crystallite." The adsorbents are characterized as weakly bound spheroidal or oval aggregates. The adsorbents furthermore normally exhibit a BET surface area of at least about 30 $m^2/g$, more preferably from about 50–700 $m^2/g$ and most preferably from about 250–600 $m^2/g$.

The adsorbents of the invention, being generally weakly held aggregates of particles or crystallites, exhibit a porous character which is believed to be important in their functionalities. The total pore volume of the aggregated adsorbents is at least about 0.5 cc/g, and more preferably from about 0.55–1.5 cc/g. In terms of average pore diameter, the preferred MgO adsorbent aggregate should have an average pore diameter of at least about 70 Å and more preferably from about 80–110 Å; the CaO aggregate on the other hand should have an average pore diameter of at least about 175 Å and more preferably from about 200–250 Å.

Transmission electron spectroscopy micrographs of the adsorbent products of the invention demonstrate that the products exhibit remarkable surface properties and morphologies, which largely result from the method of preparation thereof. Using the preferred aerogel methods of preparation, MgO and CaO exhibit lattice planes that are ordered in the 4–6 nm range, which agrees well with particle sizes determined by XRD line broadening. Edges of the nanocrystals appear to be quite rough with significant defects (e.g., edges, corners or crystal planes) and thus have very high edge to surface ion ratios of at least about 5% and more preferably from about 10–30%. In addition, examination of the surfaces of pressed adsorbent aggregates by atomic force microscopy (AFM) show a layered, appearance and more rounded aggregates, as compared with the conventionally prepared products. This is consistent with the porosities of the adsorbent products of the invention.

One class of preferred adsorbents of the invention are prepared by previously described aerogel techniques, Utamapanya et al., *Chem. Mater.*, 3:175–181 (1991). Briefly, nanocrystal MgO is prepared by reacting Mg metal turnings with methanol under argon, followed by treatment with toluene and distilled water to obtain a magnesium hydroxide gel; the latter is autoclaved to produce the necessary aerogel, whereupon the aerogel is dried at high temperature, preferably under vacuum, or under a flow of nitrogen, to obtain nanocrystals. These types of adsorbents are referred to herein as aerogel-prepared adsorbents using the designation "AP." A characteristic "fingerprint" of many AP adsorbents in accordance with the invention is the presence of a characteristic alkoxy group IR adsorbence, occurring at between 2600–3100 $cm^{-1}$.

Another class of preferred adsorbents are prepared by vacuum dehydration of metal oxide/metal hydroxide mixtures at high temperature, preferably 500° C., but covering a range of 200–800° C. This class of materials are referred as conventionally-prepared adsorbents using the designation "CP." Thus, AP-MgO refers to aerogel-prepared MgO, whereas CP-MgO refers to the conventionally-prepared MgO.

Broadly speaking, the use of adsorbents in accordance with the invention, is carried out by contacting the adsorbent powders with a target compound at a selected reaction temperature. In some instances, the reaction temperature can be quite high, up to about 800° C., but in particularly preferred forms, the reaction temperature is from about −70 to 180° C., more preferably from about −70 to 90° C. In terms of broad temperature range therefore, the reaction temperature should be from about −70 to 800° C. Normally, where elevated reaction temperatures are employed, these are obtained by heating the adsorbent and maintaining the same at the desired reaction temperature during contact with the target compound(s). In other instances, it may be suitable to heat the incoming target compound stream, or heat both the adsorbent and target compound stream.

In one type of processing in accordance with the invention, a fluid stream containing the target compound(s) may be passed through an enclosed chamber or filtering device (e.g., a gas mask) including therein a bed comprising the adsorbents of the invention. In other cases, however, the adsorbents of the invention can be used as a broadcast fog for air purification purposes, in which case the adsorbent particles would typically have an average agglomerate size of at least 10 $\mu$m so that they may initially fog and thereafter settle. The adsorbents may also be used for wide area decontamination of buildings and land areas which could be contaminated by chemical weapons or toxic chemical spills. In such cases, the adsorbents would normally have an agglomerate size of at least 0.1 mm and be used in large quantities by simply spreading the adsorbents for contact with target compounds on the surfaces, and then later collected.

A wide variety of target compounds can be adsorbed using the techniques of the invention. These target compounds may be selected from the group consisting of acids, compounds containing an atom of P, S, N, Se or Te, non-chlorinated hydrocarbon compounds and toxic metal compounds. These target compounds are either destructively adsorbed, or chemisorbed. In such destructive adsorption or chemisorption, the target compounds, or at least moieties thereof, are permanently adsorbed to thereby effectively destroy the target compounds. For example, in the case of toxic phosphorous-containing compounds, the methods of the invention serve to permanently adsorb potentially toxic phosphorous-bearing fragments or moieties of the compounds to render harmless any non-adsorbed fragments. Compounds which are believed susceptible to chemisorption include $(CF_3)_2C=CF_2$, are $Zn(CH_2CH_3)_2$, $Hg(CH_3)_2$, $Fe(CO)_5$. Acids suitable for treatment using the adsorbents of the invention (e.g., in the destructive adsorption of an acid from a gas stream) may be either Lewis acids (e.g., $SO_2$, $CO_2$, NO or $SO_3$) or Brönsted acids (e.g., $H_2S$, HCl and HBr). Exemplary target compounds containing atoms of P, S, N, Se or Te include $P(O)(CH_3)(F)[OCH(CH_3)_2]$, $S(CH_2CH_2Cl)_2$, $P(O)(OCH_2CH_3)(CN)(N(CH_3)_2)$, HCN, $H_2S$, $H_2Se$, $H_2Te$, ClCN, $C_6H_5C(O)CH_2Cl$, $SO_2$, $C(O)Cl_2$, $C_6Cl_5OH$. Typical non-chlorinated hydrocarbon compounds which may be adsorbed by the methods of the invention include $C_6H_3(OH)(NO_2)_3$, $C_6H_5CH(Br)(CN)$, $C_6H_5CH_2CN$, $(CF_3)_2C=CF_2$. Finally, representative toxic metal compounds which are candidates for successful destructive adsorption using the invention are $Zn(CH_2CH_3)_2$, $Hg(CH_3)_2$, $Fe(CO)_5$.

DETAILED DESCRIPTION OF THE PREFERRED EMBODIMENT

Figure 1:
FIG. 1 is a high resolution transmission electron microscopy micrograph depicting a portion of an aggregate of AP-MgO particles illustrating the high edge:surface ion ratio in the aggregate.

The following examples set forth preferred methods in accordance with the invention. It is to be understood, however, that these examples are provided by way of illustration and nothing therein should be taken as a limitation upon the overall scope of the invention. In these examples, "AP-MgO", "AP-CaO" and "AP-$ZrO_2$" refer to the respective aerogel prepared oxides which are suitable for use in the invention. "CP-MgO", "CP-CaO" and "CP-$ZrO_2$" refer to respective oxides produced by conventional techniques. "CM-MgO" refers to commercially obtained MgO.

EXAMPLE 1

In this example, nanoscale AP-MgO and CP-MgO absorbents were prepared and their physical characteristics determined. The AP-MgO was then used for the room temperature adsorption of $SO_2$ gas, and the adsorptive capabilities thereof were compared with CP-MgO. A $CO_2$ adsorption comparative study was also made.

Materials and Methods

A. Preparation of AP-MgO

Highly divided nanoscale MgO samples were prepared by the autoclave treatment described by Utamapanya et al., *Chem. Mater.*, 3:175–181 (1991), incorporated by reference herein. In this procedure, 10% by weight magnesium methoxide in methanol solution was prepared and 83% by weight toluene solvent was added. The solution was then hydrolyzed by addition of 0.75% by weight water dropwise while the solution was stirred and covered with aluminum foil to avoid evaporation. To insure completion of the reaction, the mixture was stirred overnight. This produced a gel which was treated in an autoclave in using a glass lined 600 ml capacity Parr miniature reactor. The gel solution was placed within the reactor and flushed for 10 minutes with nitrogen gas, whereupon the reactor was closed and pressurized to 100 psi using the nitrogen gas. The reactor was then heated up to 265 ° C. over a 4 hour period at a heating rate of 1° C./min. The temperature was then allowed to equilibrate at 265° C. for 10 minutes.

At this point, the reactor was vented to release the pressure and vent the solvent (final reactor pressure was about 700 psi). Finally, the reactor was flushed with nitrogen gas for 10 minutes. This produced fine white powdery magnesium hydroxide (aerogel) having a surface area on the order of 1000 $m^2/g$ which was then thermally converted to MgO as explained below.

The $Mg(OH)_2$ particles were then thermally converted to MgO. This was accomplished by heating the $Mg(OH)_2$ under dynamic vacuum ($10^{-2}$ Torr.) conditions at an ascending temperature rate to a maximum temperature of 500° C. which was held for 6 hours. Further details about the MgO preparation can be found in PCT Publication WO 95/27679, also incorporated by reference herein.

B. Preparation of CP-MgO

CP-MgO was prepared by hydrating 99.99% ultrapure magnesium oxide with excess distilled deionized water, heating it in air forming magnesium hydroxide and treating $Mg(OH)_2$ dynamic vacuum at the same conditions used in preparing AP-MgO.

C. Characterization of AP-MgO and CP-MgO

1. Surface Area. Surface area measurements were performed using 200 mg samples of magnesium hydroxide from each preparative procedure, slowly heated to the desired temperature under dynamic vacuum. CP-MgO was heated overnight for more complete dehydration. Final temperature was then maintained for 3 hours and the weight of magnesium oxide was calculated from experimental weight loss. The Brunauer-Emmett-Teller (BET) one-point gas absorption method was employed using $N_2$ adsorption at liquid $N_2$ temperature to measure the surface area. The BET surface area measurement technique is described in *Introduction to Powder Surface Area*, Lowell, S., John Wiley & Sons: New York (1979), incorporated by reference herein.

2. Surface Hydroxyl Groups. Using the sample and vacuum line from surface area analysis, measurement of surface hydroxyl groups was conducted. With a static atmospheric pressure of dry nitrogen over the magnesium oxide sample, a 1 mL portion of 1.0 M solution of $Al(C_2H_5)_3$ in deoxygenated Decalin was slowly added. The mixture was allowed to react overnight producing a pressure, thus a volume, of ethane gas that was periodically measured during the reaction process. Note reaction below:

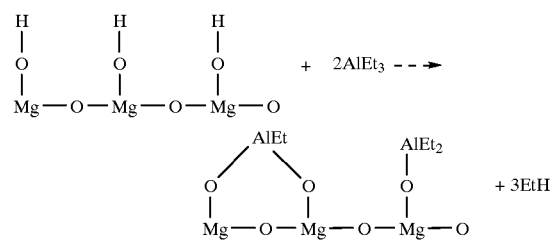

From the volume of ethane, the pressure (less solvent vapor pressure) and the temperature, the moles of ethane, thus the moles of hydroxyl groups, were calculated. Knowing the sample surface area allowed the final conversion to more useful units of hydroxyl groups per $nm^2$.

3. Transmission Electron Microscopy. Transmission electron microscopy was used for AP-MgO and CP-MgO samples that were heated at 500° C. maintained overnight under dynamic vacuum of 1 millitorr, cooled to room temperature and sealed under Ar until studied.

4. Atomic Force Microscopy (AFM). Imaging the sample surfaces was carried out using a commercial AFM instrument (SPM 30 from Wyco Co., Tucson, Ariz.) in contact mode. A 100 μm-long cantilever with a spring constant of 0.0625 N/m and $Si_3N_4$ tip was used. The force employed was about $78.10^{-9}$ N. The sample surfaces were scanned using the height mode, where the force, and hence the distance between the tip and the surface is kept constant. All images (256×256) pixels were recorded in air at room temperature using a slight filtering during the data acquisition. Different parts of the sample were investigated to make sure that the observed structure was representative and reproducible.

5. Fourier Transform Infrared Spectrometry. Pellets 13 mm in diameter and ca. 30 mg were made of AP-Mg(OH)$_2$ and CP-Mg(OH)$_2$ using a Spectra-tech Inc. Die model 139 and a Carver laboratory press model B with ca. 700 psi on the press. The pellets were transferred to the lower section of an in situ-IR cell and treated by ramping to 500° C. over 3 hours and soaking at 500° C. for an additional 3 hours. Room temperature IR spectra were then recorded using a Perkin-Elmer 1330 infrared spectrometer with 256 scans, 2 $cm^{-1}$ resolution and aperture of 1.0 $cm^{-1}$.

D. Adsorption of $SO_2$ and $CO_2$ on AP-MgO and CP-MgO.

1. Pretreatment Temperature. 80 mg samples of AP-Mg (OH)$_2$ were loaded on a spring balance and slowly heated under dynamic vacuum to the desired temperature and maintained for 3 hours. CP-MgO was heated overnight. Each sample was then cooled to room temperature for 1 hour, and 20 torr of $SO_2$ was introduced to the sample chamber, allowing static contact for 15 minutes, followed by 100 minutes of evacuation. The change in spring position, thus weight difference, was measured before and after heating and before and after evacuation. Evacuation removed the physically adsorbed $SO_2$ allowing the calculations of physically and chemically adsorbed amounts. To understand the effect of heat treatment temperature on adsorption abilities, this process was followed for preheating temperatures of 25, 120, 250, 300, 400, and 500° C. and, using the surface area determination, $SO_2/nm^2$ was calculated. The $SO_2$ used in these studies was 99.9+ % pure purchased from Aldrich.

A duplicate study was completed for $CO_2$ on AP-MgO and CP-MgO heat treated at 500° C. only.

2. Desorption of $SO_2$. Following the process described previously with 20 torr of $SO_2$ statically in contact with AP-MgO, $SO_2$ was then steadily desorbed under dynamic vacuum at temperatures of 100, 200, 300, 400, and 500° C. at one half hour intervals and 500° C. overnight with spring balance positions, and thus loading amount, calculated for each temperature.

3. Oxygen Scrambling. To determine if $SO_2$ exchanges oxygen with the surface of the MgO, an isotropic scrambling study was conducted. Previous experiments showed that nanoscale MgO does exchange lattice oxygen and surface OH groups with water vapor. A Perkin-Elmer Qmass Spectrometer 910 modified with an in-situ reactor was employed using an HP1 crosslinked methyl silicone gum capillary column of 12 m×0.2 mm×0.33 μm thickness, and 99.99% ultra high purity He carrier gas at a flow rate of 50 mL/min and temperatures of column and injector port at 120° C. In short, 100 mg of AP-Mg-O, previously heat treated to 500° C., was transferred under inert atmosphere to the in-situ reactor and attached in line with the GC/MS. In order to prepare $Mg^{18}O$, injections of 1 μL of $H_2^{18}O$ were initiated and the effluent of each injection studied. Injections of $H_2^{18}O$ ended when equilibrium conditions of the surface layer exchange were met; more than one layer of surface oxygens were exchanged at a reactor temperature of 500° C. The reactor was then cooled to room temperature and 400 μL injections of $SO^2$ were initiated and the effluent studied by GC/MS.

4. Powder X-ray Diffraction. A Scintag-XDS-2000 was used for powder X-ray diffraction spectra of AP-MgO (≈1 g) heat treated at 500° C. for 3 hours under dynamic vacuum and ($10^{-3}$ torr) and cooled to room temperature. The sample was then exposed to 20 torr of $SO_2$ under static conditions, for 15 minutes and directly analyzed.

Results

A. Characterization of AP-MgO and CP-MgO

1. Surface Area. Surface area determinations for AP-MgO and CP-MgO at heat treatment temperatures of 25, 120, 250, 300, 400, and 500° C. were completed using the BET one-point method. AP-MgO consistently had higher surface areas (350–450 $m^2/g$) than CP-MgO (50–250 $m^2/g$) with maximum surface area for both samples attained near 300° C. heat treatment temperatures. It is believed that above 400° C., sintering, or structural rearrangement, is initiated, transforming less table high index planes into domains of more stable planes, thus leading to lower surface areas and more crystalline material. Also, this high temperature annealing process can remove surface defects while forming a more perfect crystal structure.

2. Surface Hydroxyl Groups. Surface hydroxyl groups remaining on the surface after heat treatments of 120, 300, 400, 500 and 700° C. were measured. With an increase in heat treatment temperature for both samples comes an anticipated decrease in OH groups (from $8/nm^2$ to about $1/nm^2$; note that maximum coverage would be $12/nm^2$. Even at temperatures of 700° C., isolated OH groups remain on AP-MgO and CP-MgO, with AP-MgO spectral peaks having stronger intensity. The $OH/nm^2$ is lower for AP-MgO than for CP-MgO until temperatures above 500° C. were reached, probably due to the presence of residual methoxy groups, instead of OH groups, still on the surface of AP-MgO until 500° C.

3. Transmission Electron Microscopy. TEM prints of AP-MgO and CP-MgO clearly show a major difference in morphology. AP-MgO appears as collections of weakly attracted spheroidal particles of 2–6 nm in diameter, while CP-MgO appears as, on average, 9 nm thick hexagonal plates. Previous XRD studies of AP-MgO and CP-MgO confirm these average crystallite sizes, determined from peak broadening using he Scherrer equation. Also, the crystal structure of both sample was determined to be periclase MgO. FIG. 1 is a high resolution TEM micrograph of an aggregate of AP-MgO crystallites. On the fringe particles lattice spacings are discernable, and appear to be ordered over a 4–6 nm range.

Conclusions

In order to estimate the edge to surface ion ratio in the AP-MgO crystallites, an idealized truncated octahedron shape was assumed for the AP-MgO. In reality, the AP-MgO particles or crystallites exhibit several kinds of surface configurations, such as pentagonal, hexagonal and octagonal, and accordingly the calculated edge to surface ion ratios derived using the truncated octahedron assumption are probably minimums. In any case, under this assumption and the known values of $Mg^{+2}$ and $O^{-2}$ ionic radii, the following calculation gave the desired edge atom/surface ion ratio for various AP-MgO particle diameters.

Size of the ions (radius): $Mg^{2+}=0.66$ Å; $O^{2-}=1.32$ Å
Number of edges: 36
Length of each edge: a

$$b = a\frac{\sqrt{3}}{2} \cong 0.8660a$$

Area of a hexagon=$6 \cdot \frac{1}{2}a^2 \cdot 0.8660 = 2.5981\ a^2$
Area of a square=$a^2$ The truncated octahedron contains 6 squares and 8 hexagons, and each of them has edges a. Therefore, the area of all squares is equal to 6 $a^2$ and the area of all hexagons is equal to 8–2.5981 $a^2$. The area of all hexagons and squares on the surface of the truncated octahedron is:

Area=$6\ a^2 + 8 \cdot 2.5981\ a^2 = 26.78\ a^2$

Assuming that the diameter of the polyhedron is approximately 3a and the ion-ion distance, d, is 1.98 Å (0.66 Å +1.32 Å) the number of the surface and edge ions is obtained as follows:

$$\text{Surface ions} = \frac{26.78a^2}{d^2}$$

Using these formulas, the ratio of edge to surface ions can be calculated. The results for four different sizes of crystallite (3, 4, 10, 20 nm diameter, D) are shown in Table I. Table I. Ratio of edge to surface ions in AP-MgO assuming truncated octahedron shape for four particle or crystallite diameters.

$$\text{Edge ions} = \frac{36a}{d}$$

| Diameter | a = D/3 | Number of Surface Ions | Number of Edge Ions | Edge/Surface Ions |
|---|---|---|---|---|
| 3 nm = 30 Å | 10 Å | 683 | 182 | 27% |
| 4 nm = 40 Å | 13.3 Å | 1,208 | 242 | 20% |
| 10 nm = 100 Å | 33.3 Å | 7,575 | 605 | 8% |
| 20 nm = 200 Å | 66.7 Å | 30,360 | 1,213 | 4% |

D = diameter of the polyhedron
a = length of the edge

The foregoing table demonstrates that as particle diameter increases, the edge to surface ion ratio falls precipitously. The estimated diameter of the AP-MgO particles of this example is about 4–5 nm; therefore the estimated ratio is on the order of 20%.

Similar calculations regarding CP-MgO (made up of larger particles or crystallites than AP-MgO) using an idealized hexagonal shape gives much lower edge to surface atom ratios, on the order of 0.5%.

4. Fourier Transform Infrared Spectrometry. Spectra of AP-MgO and CP-MgO after 500° C. heat treatment showed a peak centered at ca. 3750 cm$^{-1}$, yet for AP-MgO this peak was noticeably more intense and sharper. It is known that particle size affects spectra, with larger particles, here CP-MgO, giving lower intensity and resolution. This peak was assigned to isolated OH groups. Employing high temperature degassing above 700° C., Knözinger and coworkers (Knözinger et al., Surf Sci., 1993, 290, 388) found that this band separates with the higher frequency component attributed to 1-coordinated OH groups (type A) and the lower frequency component to higher coordination OH groups (type B). The pK of the surface hydroxyl at 3752 cm$^{-1}$ was reported to be 15.5±0.4 (Hair et al., *Phys. Chem.*, 1990, 74, 191).

The region below 2000cm$^{-1}$ is harder to assign and is therefore rarely discussed in the literature. In general, these peaks are related to surface species such as hydrides, OH bending modes, carbonates and bicarbonates, with some peaks yet to be identified.

B. Adsorption of $SO_2$ on AP-MgO and CP-MgO

Figure 2:
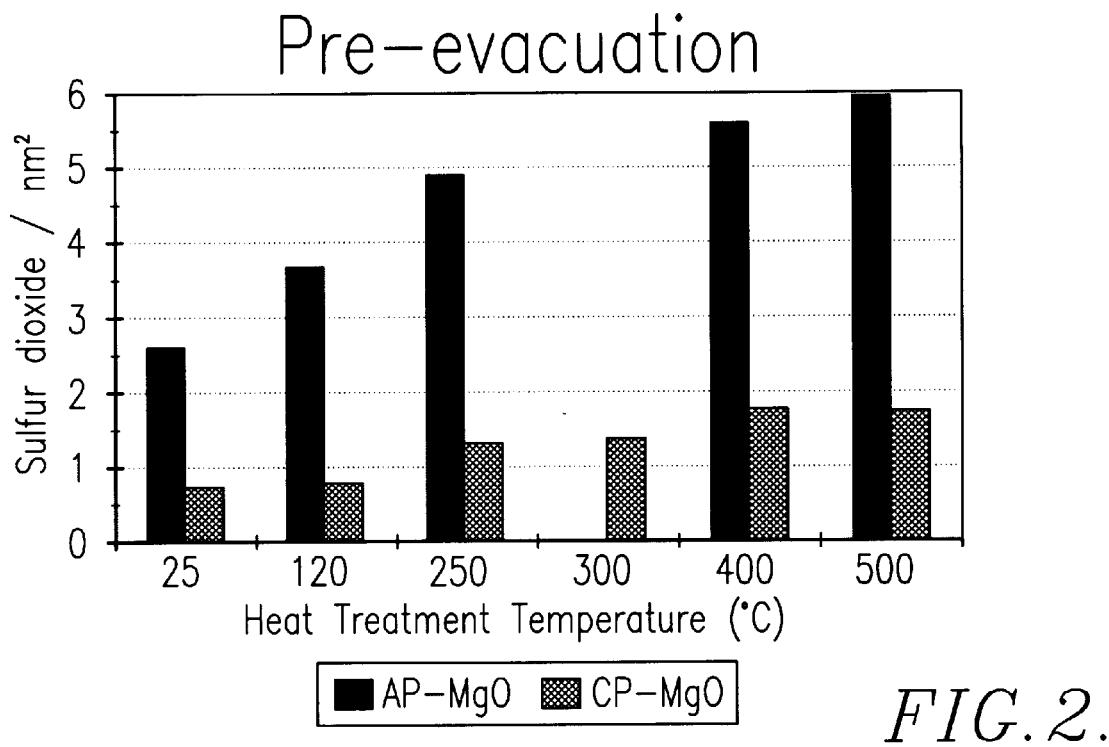
FIG. 2 is a bar graph illustrating the number of $SO_2$ moieties/$nm^2$ adsorbed on at room temperature at 20 torr AP-MgO and CP-MgO adsorbent preheated to various temperatures, prior to evacuation of the reaction vessel.
Figure 3:
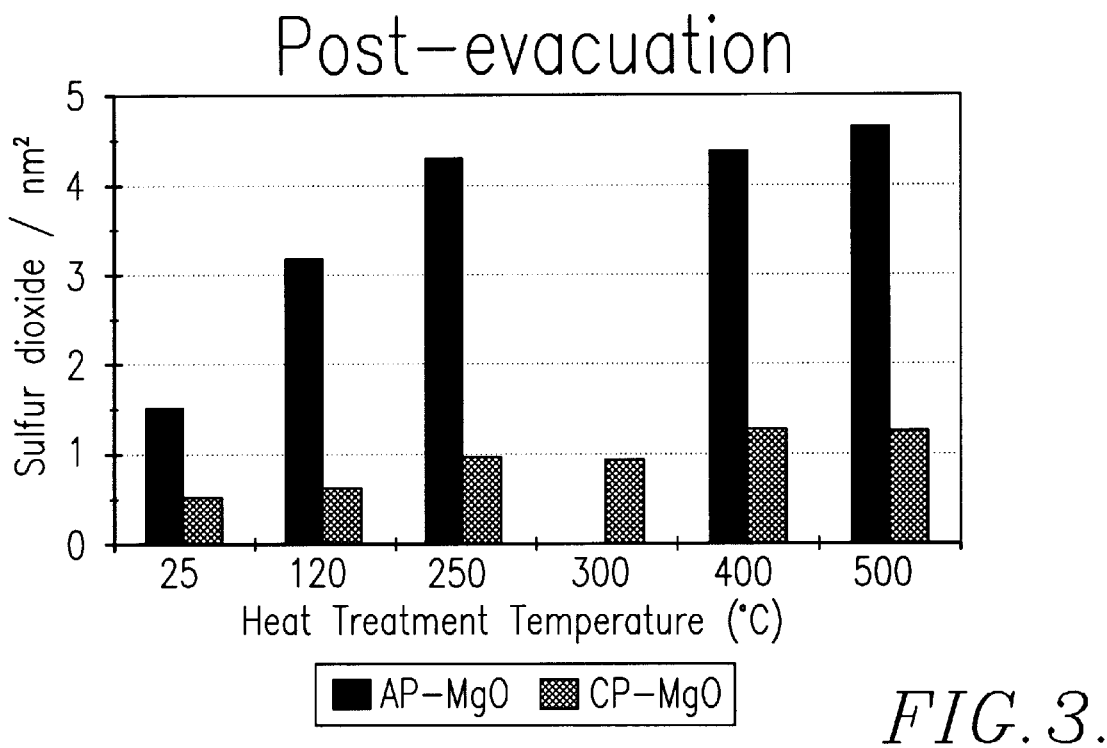
FIG. 3 is a bar graph similar to that shown in FIG. 2, but illustrating the number of $SO_2$ moieties/$nm^2$ after evacuation of the reaction vessel.

1. Pretreatment Temperature. The amount of $SO_2$ adsorbed on AP-MgO and CP-MgO was measured as $SO_2$/nm$^2$ at various heat treatment temperatures of 25, 120, 250, 300, 400 and 500° C. The pre-evacuation amounts of $SO_2$ at each temperatures are shown in FIG. 2 and include physically and chemically adsorbed $SO_2$ species. The FIG. 3 graph gives the post-evacuation amounts of $SO_2$ at each temperature. Since these calculated results are corrected for surface area, they are in units of $SO_2$/nm$^2$. A comparison of FIGS. 2 and 3 demonstrates that more $SO_2$ is adsorbed on AP-MgO than on CP-MgO per surface unit. Thus it is deduced that APMgO must have intrinsically different surface characteristics and perhaps different or more numerous active sites, allowing higher reactivity with $SO_2$. Comparing the FIG. 2 pre-evacuation results with FIG. 3 post-evacuation results, it is clear that most of the $SO_2$ adsorption is chemisorption. For both samples, the adsorbing ability increases with preheat treatment temperature. Noting that the samples began as $Mg(OH)_2$ and were dehydrated with heat treatment, a possible explanation for this phenomenon is as follows. Dehydration opened sites for adsorption formerly occupied by water, hydroxyls and hydrogen atoms. For AP-MgO additional sites formerly occupied by methoxy groups and other carbon species were also formed at 500° C.

Figure 4:
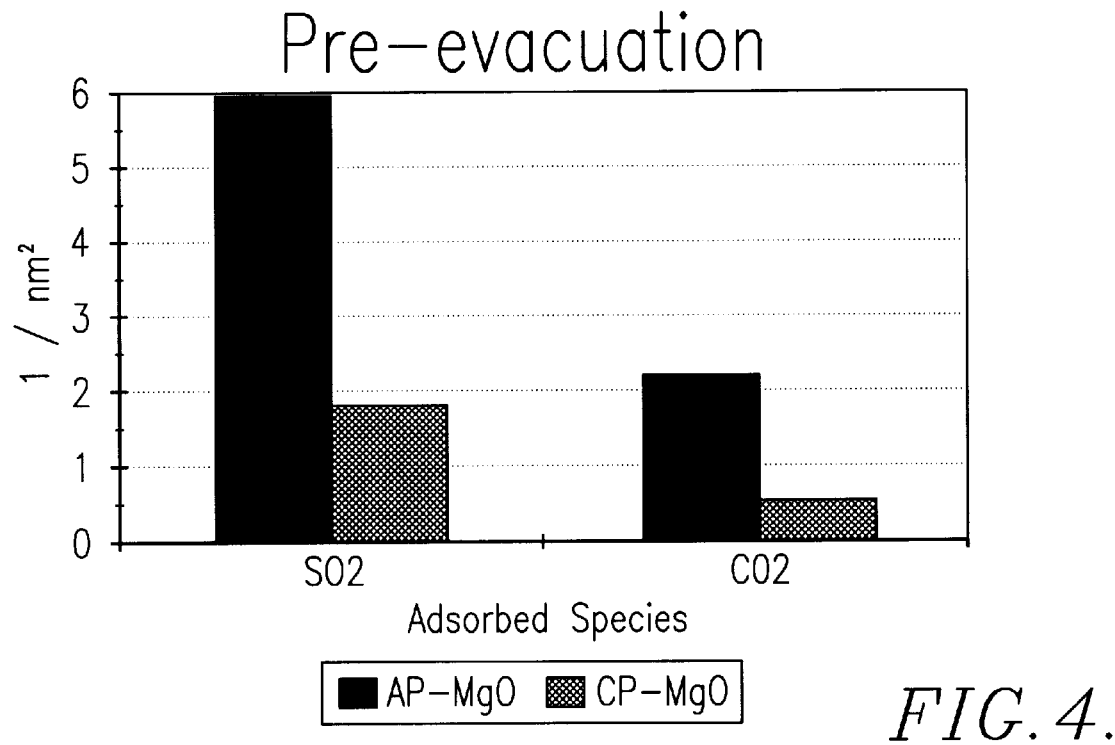
FIG. 4 is a bar graph illustrating the number of $SO_2$ moieties/$nm^2$ and $CO_2$ moieties/$mn^2$ adsorbed at room temperature at 20 torr on AP-MgO and CP-MgO pretreated at 500° C., prior to evacuation of the reaction vessel.
Figure 5:
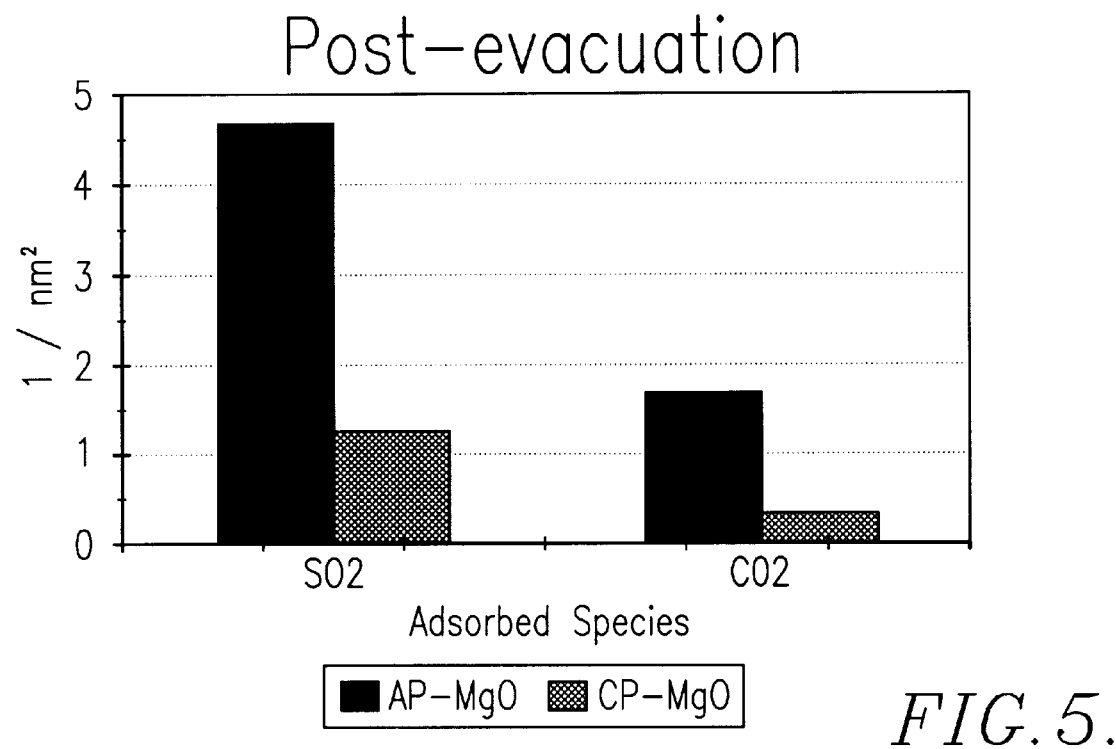
FIG. 5 is a bar graph illustrating the number of $SO_2$moieties/$nm^2$ and $CO_2$ moieties/$nm^2$ adsorbed at room temperature at 20 torr on AP-MgO and CP-MgO pretreated at 500° C., after evacuation of the reaction vessel.

As a comparison, $CO_2$ was also adsorbed on AP-MgO and CP-MgO heat treated at 500° C. Once again, pre-evacuated and post-evacuated results given respectively in FIGS. 4 and 5, demonstrated that most of the $CO_2$ was chemisorbed on both MgO samples. Surface area corrected results show that significantly more $CO_2$ was adsorbed on AP-MgO than on CP-MgO. It can also be noted that $SO_2$ being a stronger acid gas, adsorbed three times more than $CO_2$. Therefore, it appears that $CO_2$ is more selective than $SO_2$ (which probes all basic sites whatever their strength).

2. Desorption of $SO_2$. AP-MgO heat treated at 500° C. and exposed to $SO_2$ was systematically heated under dynamic vacuum on spring balance to observe the desorption of $SO_2$. The desorption of $SO_2$ did not appreciably occur until temperatures of 300° and greater were met. By 500° C., 0.90 $SO_2$/nm$^2$ remained on the surface and 0.63 $SO_2$/nm$^2$ after overnight treatment.

3. Oxygen Scrambling. After exchange of AP-MgO with $H_2^{18}O$ at 500° C., a sample of AP-Mg$^{18}$O was treated with 400 µl gaseous $SO_2$ injections. The first few injections caused the desorption of mixed CO, $C^{18}O$, $CO_2$, $CO^{18}O$, and $C^{18}O^{18}O$ plus a mixture of $H_2O$ and $H_2^{18}O$. After the 12th injection, a mixture of $SO_2$ $SO^{18}O$, and $S^{18}O^{18}O$ was evolved while the sample was maintained at 500° C.; the major component was the single labeled component $SO^{18}O$. These experiments demonstrate that at 500° C., $SO^2$ and $CO_2$ (as carbonate) are exchanging oxygens with surface and lattice $^{18}O$. Furthermore, $SO_2$ displaces surface carbonate.

Powder X-ray diffraction of the $SO_2$ treated $Mg^{18}O$ showed only the MgO periclase structure, verifying the bulk structure was not changed.

Discussion

A. Morphological Differences. Normally, particles or crystallites of MgO have cubic rock salt morphology, while $Mg(OH)_2$ crystallites exhibit hexagonal plate morphology. Electron micrographs confirm the mostly cubic shape of normal MgO crystals showing predominantly stable (100) planes.

It has also been shown that the choice of precursor and the manner of preparation of MgO produces different morphologies and properties. Herein both CP-MgO and AP-MgO were produced by the dehydration of $Mg(OH)_2$. In the case of CP-MgO, remnants of the hexagonal structure of Mg(OH) are partly preserved. However, in the case of AP-MgO, the precursor is a gel-like disoriented $Mg(OH)_2$ and dehydration leads to very small spheroidal particles with an abundance of defects, steps and truncated corners, resulting in the exposure of various crystal planes (see FIG. 1). Therefore, AP-MgO possesses a large surface moieties/bulk ratio and more ions in 4-coordinate and 3-coordinate sites than CP-MgO. AP-MgO should therefore also expose higher index planes, such as (111), than CP-MgO. Furthermore, AP-MgO exhibits a pore structure due to the loose packing of the small, spherical 4 nm crystallites.

EXAMPLE 2

In this example, AP-MgO and CP-MgO prepared as described in Example 1 was used to adsorb acids, namely HCl, HBr, NO and $SO_3$.

Experimental

A. Gravimetric Analysis Using a Quartz Spring Balance.

A spring balance was used to measure the amount of physically and chemically adsorbed acid gas adsorbed onto the MgO surface. $AP-MgO(OH)_2$ and $CP-Mg(OH)_2$ were pressed into pellets, crushed with a mortar and pestle and sifted through a mesh to produce uniform size aggregates. Then 100 mg of the $Mg(OH)_2$ was loaded into the basket of the spring balance and slowly evacuated to 1 millitorr. The initial spring position was then measured with the attached magnifying scope. The sample was heated to 500° C. over three hours and maintained for either three hours, forming AP-MgO-3h and CP-MgO-3h, or overnight, forming AP-MgO-on and CP-MgO-on. After complete cooling to room temperature for one hour, the spring position was measured again. The samples were then were exposed to 100 torr of acid gas for 15 minutes and later evacuated for one hour with spring positions measured before and after adsorption. Samples heated overnight were exposed to 100 torr of acid gas for one hour followed by evacuation for one hour, again measuring spring positions before and after evacuation. Weight calculations were made from the calibrated spring constant. The weight loss was calculated and subtracted from the $Mg(OH)_2$ weight to find the weight of MgO. Surface area measurements of the type described in Example 1, showed that heating overnight verses three hours did not appreciably change the surface area. The AP-MgO and CP-MgO used in these experiments had surface areas of 302 and 177 $m^2/g$ and surface hydroxyl concentrations of 1.7 and 1.2 $OH/nm^2$ respectively. The acid gases used in these experiments were 99+ % HCl, 99+ % HBr, and 98.5% NO in lecture bottles purchased from Aldrich. The $SO_3$ was 99% pure, stabilized, and contained some low-melting solid polymer, the formation of which is unavoidable. The $SO_3$ was mildly heated to melt it, transferred to a Schlenk tube under inert conditions and freeze-pump-thawed to further purify. For use, the $SO_3$ was mildly heated to melt it and the vapor pressure produced was used.

B. Fourier Transform Infrared Spectroscopy

Self-supporting pellets of $AP-Mg(OH)_2$ and $CP-Mg(OH)_2$ were made using ca. 30 mg of sample in a Spectra-tech Inc. die model 129 and a Carver laboratory press model B. The pellets were 13 mm in diameter with area of 1.3 $cm^2$ and were pressed at 7000 psi. The pellets were then transferred to the lower section of an in-situ IR and evacuated to 1 millitorr. Like the spring balance samples, the pellets were heated to 500° C. over three hours and maintained for 3 hours or overnight, cooled to room temperature for one hour and, finally, exposed to 100 torr of acid gas. A Perkin-Elmer 1330 infrared spectrometer with 256 scans, 2 $cm^{-1}$ resolution and 1.0 $cm^{-1}$ aperture was used to collect spectra. The pellet was manually transferred to the cell portion of the in-situ cell where IR plates of KBr were affixed. Spectra were taken before and after exposed to the acid gas, followed by an extensive multistep evacuation where spectra were collected after evacuation times of 5 minutes, 4 hours and 18 hours. The sample was then heated to temperatures of 100, 150, 300, 500, 600, 700 and 800° C. under dynamic vacuum for 3 hours at each temperature with room temperature IR spectra recorded at each step. In some cases, subtractions of MgO spectra were performed where preadsorption spectra were subtracted from adsorption spectra by a factor of one to elucidate band shape.

Results

A. Brönsted Acids: HCl and HBr

1. Adsorption Results. The amount of HCl and HBr adsorbed at 100 torr for one hour on AP-MgO-on and CP-MgO-on are shown in Table II and at 100 torr for 15 minutes on AP-MgO-3h and CP-MgO-3h in Table III. After evacuation, no appreciable amount of HCl or HBr was desorbed, and therefore it was deduced that nearly all the adsorption occurred via chemisorption. This complete chemical adsorption correlates with the dissociative nature of HCl and HBr chemisorption to metal oxide surfaces. The variation of heat treatment time, as mentioned earlier, does not appreciably change the surface area, but further "cleaning" and possible annealing could occur. It was also found that 80 to 90% of the adsorption takes place in the first 15 minutes. Therefore, differences between data in Tables II and III were most likely due to the heat treatment. AP-MgO adsorbed more HCl and HBr, mmol to mol of MgO, but after surface area effects were corrected for, it can be shown that CP-MgO adsorbs more HCl and $HBr/nm^2$. Note, for AP-MgO-on, adsorption of HCl and HBr was identical, whereas CP-MgO-on shows slightly more HCl adsorbed than HBr. Both AP-MgO-3h and CP-MgO-3h showed more adsorption of HCl than HBr with ca, a 50% increase for AP-MgO and a 40% increase for CP-MgO. By comparing heat treatment times to adsorption ability, for AP-MgO, the increase in heat treatment time increased the adsorption ability for HBr and decreased the adsorption ability for HCl. However, for CP-MgO, the increase in heat treatment time afforded an increase in adsorption for both HCl and HBr.

2. Fourier Transform Infrared Results. Before adsorption of HX, AP-MgO had a sharp band at 3750 $cm^{-1}$ due to residual isolated —OH after the 500° C. preheat treatment. Upon HCl or HBr adsorption a broad band centered at 3525 $cm^{-1}$ (due to hydrogen bonded surface —OH) was produced (Table IV). However, the isolated -OH band remained. Evacuation for 5 minutes caused no change.

B. Lewis Acids: NO and $SO_3$

1. Adsorption Results. The amounts of NO, $SO_2$ and $SO_3$ adsorbed at 100 torr for one hour on AP-MgO-on and CP-MgO-on are shown in Table V. CP-MgO clearly adsorbed more of these adsorbates than AP-MgO, with the exception of NO on MgO heat treated overnight. By comparing heat treatment times, both AP-MgO and CP-MgO for longer heat treatment times showed increased adsorption ability towards these adsorbates, with an exception for $SO_3$ on CP-MgO, where the adsorption was nearly the same for both heat treatments.

2. Fourier Transform Infrared Results. Tables VI-VII summarize the IR bands generated upon adsorption of NO and $SO_3$ on AP-MgO and CP-MgO.

Discussion

A. Hydrogen Halides.

The chemisorption of HCl and HBr proceeded dissociatively as expected. Although Mg-Cl vibrations could not be detected in the IR due to masking by MgO lattice vibrations, newly formed surface —OH groups were readily observed. Isolated residual —OH groups (3750 $cm^{-1}$) were retained on AP-MgO even after HCl adsorption, although upon HBr adsorption, this band disappeared. In all cases, broad bands for hydrogen bonded —OH were formed (about 3000–3600 $cm^{-1}$), although the narrowest band (3300–3650 $cm^{-1}$) was observed on AP-MgO. Peaks for adsorbed water were also observed after HCl or HBr adsorption (1600–1620 $cm^{-1}$), and this adsorbed water could be removed by evacuation at 150° C. for all samples.

The differences in the isolated —OH band is of particular interest. This band was present on the starting AP-MgO, and was retained upon HCl adsorption. However, for CP-MgO, this band disappeared upon HCl addition, and upon heating and evacuation, it reappeared shifted to 3723 $cm^{-1}$ (from 3745 $cm^{-1}$ initially), suggesting a transfer of surface —OH groups from lower coordination to higher coordination.

In comparing the spectra of HX adsorbed on AP-MgO and CP-MgO, the differences are only minor. Perhaps the only significant difference is the tendency of AP-MgO to preserve its isolated —OH groups even after HCl adsorption and the fact that the band is highest (3750 $cm^{-1}$) on the AP-MgO sample. This would suggest that these isolated —OH groups are located on lower coordination sites.

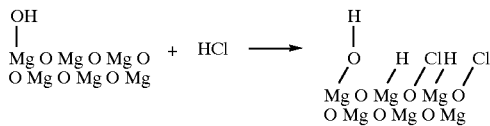

The amounts of HCl and HBr adsorbed are consistently higher on AP-MgO on a mmol/mol basis. This is as expected based on the higher surface areas. However, note that on the basis of per $nm^2$, and at relatively high pressures of HX (>100 Torr), the CP-MgO sample is superior. Initially, this was surprising, until a study of pressure effects on adsorbed amounts of $SO_2$ was completed, where it was shown that at low pressures, where monolayer (or less) coverage was expected, the greater surface reactivity of AP-MgO allowed more adsorption/$nm^2$. It was found that as the pressure of adsorbate went up, multilayer adsorption took place. It was rationalized that the formation of multilayers on CP-MgO was more favorable based on its more ordered morphology.

Calculations based on MgO crystal surfaces show that a monolayer of HCl should be 12 HCl/$nm^2$ MgO. For AP-MgO essentially a monolayer was adsorbed (1:1 ratio of HCl: MgO surface). However, for CP-MgO clearly a second layer, actually about 1 ½ layers, formed at greater than 100 Torr pressure. This multilayer is apparently more favored on the microcrystalline CP-MgO, as shown by the increased adsorption amount and by the increased broadness of the IR band for hydrogen bonded HCl. It is also noted from Table II that sample evacuation did not remove the adsorbed HCl or HBr; therefore even the second layer was strongly chemisorbed (possibly dissociatively). An explanation for CP-MgO adsorbing a second layer, while AP-MgO does not, may lie in the fact that the flat planes on CP-MgO are able to accommodate more ordered self association in HCl or HBr (as previously proposed for $SO_2$ adsorption). However, another rationale also needs to be considered. Earlier work showed that CP-MgO exhibited enhanced basicity and it was proposed that basic/reducing character depends on more long range order (existence of domains). Thus, it may be that a combination of "electronic" and "morphological" effects are working together to allow the larger crystallites to adsorb more than a monolayer of HCl (or HBr) under the conditions employed.

B. Nitrogen Monoxide

Nitrogen monoxide adsorbs as a Lewis base donating electron density to $Mg^{2+}$ either through its nitrogen or oxygen atoms. It was postulated that NO would be a good probe of $Mg^{2+}$ coordination on the surfaces of AP-MgO and CP-MgO. On both MgO samples very strong absorptions (1168 and 1170 $cm^{-1}$) for Mg—N—O were observed. However, bands at 1415 $cm^{-1}$ on both samples were also observed and are probably due to O—N—O where NO has adsorbed on a $O^{2+}$ site as well. A Peak at 1212 $cm^{-1}$ was observed on both samples and is attributed to bidentate $NO_2$. Also observed was a small peak at 2200 $cm^{-1}$ due to adsorbed $N_2$ which was quickly loss upon evacuation.

The only differences ascertained were: A band at 2245 $cm^{-1}$ for adsorbed $N_2O$ was observed only on AP-MgO. Perhaps the only conclusion is that the AP-MgO enabled some chemistry to occur under mild conditions, namely NO disproportionation to yield adsorbed $N_2O$ and $NO_2$. The $N_2O$ product was not observed on CP-MgO. The amounts of NO adsorbed (Table V) show that over a 1 hour period AP-MgO is a superior agent for adsorbing NO, both on a mmol/mol basis and on per $nm^2$ basis. The NO molecule should take up a cross sectional area of 0.072 $nm^2$, so that 14 would be the number of NO molecules (linear adsorption structure) on one $nm^2$ of MgO (100 plane). The data for amount of NO adsorbed clearly indicates that less than one monolayer adheres to the AP- or CP-MgO. Thus, it is seen that when either low pressures are employed, or adsorbates with relatively low heats of adsorption are employed, AP-MgO exhibits superior behavior. It is only when multilayer coverage occurs that CP-MgO is generally superior.

C. Sulfur Trioxide

In the case of $SO_3$ adsorption, both AP-MgO and CP-MgO showed strong IR bands for sulfate species (1260 and 1105 on AP-MgO and 1290, 1220, and 1140 for CP-MgO). The spectra were more complex in the case of CP-MgO, indicating multiple sulfate species.

The $SO^3$ adsorbed was obviously in multilayers and, as expected, on a mmol/mol basis, AP-MgO was superior, but on a per $nm^2$ basis, CP-MgO prevailed.

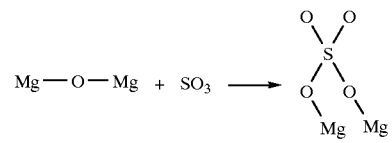

In the case of $SO^3$, using 0.27 $nm^2$ as its cross sectional area, the number of $SO^3$ molecules that would be adsorbed on one $nm^2$ of MgO (100 plane) would be 3.7. The data show that 4 monolayers on AP-MgO and 6 monolayers on CP-MgO are adsorbed (Table V). This is the largest amount/nm² for the molecules reported in this study. In this case, CP-MgO clearly shows its superior property for multilayer adsorption, apparently due to the more highly ordered nature of the microcrystals in CP-MgO compared with the nanocrystalline AP-MgO, both on per nm² and mmol/mol basis. It should also be noted that $SO^3$, in particular, easily forms polymers, which may be what is affording the higher adsorption amounts.

Conclusions

On a mmol/mol basis, nanoscale MgO (AP-MgO) adsorbs more HCl, HBr, NO and $SO^3$ than microscale MgO(CP-MgO). However, on a per nm² basis the larger, more crystalline CP-MgO is superior, and this appears to be due to the formation of more ordered multilayers, apparently allowing more adsorbate molecules to adsorb/nm².

For NO, which at 100 Torr adsorbs less than a monolayer, the nanocrystalline MgO is superior as an adsorbent on both the per nm² and mmol/mol basis.

In general, the nanoscale MgO crystallites possess a more reactive surface. However, when multilayer adsorption occurs, the more ordered surfaces on larger crystallites became more important. This multilayer adsorption is encouraged by higher adsorption pressures (>100 torr, and, of course, by the strength of interaction of the surface-adsorbate pair in question).

It is possible that both "electronic" effects and "morphological" effects combine to allow the microcrystalline CP-MgO to adsorb multilayers of HX and $SO_2$ and $SO^3$. However, in order for CP-MgO to exhibit this behavior, relatively high pressures of adsorbate must be employed.

TABLE II

Amount of HCl and HBr Adsorbed at 100 torr for 1 Hour on AP-MgO-on and CP-MgO-on.

| | AP - MgO | | CP - MgO | |
| --- | --- | --- | --- | --- |
| Gas | per nm² | mmol per mol MgO | per nm² | mmol per mol MgO |
| HCl | 10.9/11.0 | 221/222 | 17.9/17.5 | 212/207 |
| HBr | 11.1/11.1 | 224/224 | 15.6/15.5 | 185/183 |

Note: The first number is total adsorption amount and the second number is the amount after evacuation. All data are averages of 2 or 3 trials with <10% error. The term "on" stands for overnight prior evacuation.

TABLE III

Amount of HCl and HBr Adsorbed at 100 torr for 15 Minutes on AP-MgO-3h and CP-MgO-3h.

| | AP - MgO | | CP - MgO | |
| --- | --- | --- | --- | --- |
| Gas | per nm² | mmol per mol MgO | per nm² | mmol per mol MgO |
| HCl | 12.0 | 245 | 16.2 | 191 |
| HBr | 7.88 | 160 | 11.9 | 141 |

Note: All data are averages of 2 or 3 trials with <10% error. The term "3h" stands for 3 hours prior evacuation.

TABLE IV

IR Bands and Assignments for AP-MgO-3h and CP-MgO-3h Produced Upon HCl and HBr Adsorption

| HX | Band Position and Strength (cm⁻¹) | Effect of 5 minute evacuation | Assignment |
| --- | --- | --- | --- |
| | AP-MgO-3h | | |
| None | 3750 (vs) | | Isolated —OH (residual) |
| HCl | 3750 (vs) remains | 3745 | Isolated —OH |
| | 3300–3640 (s, broad) | no change | Hydrogen bonded —OH |
| | 1708 (s) | no change | — |
| | 1605 (s, broad) | no change | adsorbed water |
| None | 3738 (vs) | | Isolated —OH (residual) |
| HBr | (3738 removed) | 3738 partially restored | Isolated —OH |
| | 2950–3665 (s, very broad) | no change | Hydrogen bonded —OH |
| | 1702 (w) | | — |
| | 1614 (vs) | no change | adsorbed water |
| | CP-MgO-3h | | |
| None | 3745 (s) | | Isolated —OH (residual) |
| HCl | (3745 removed)ᵇ | | Isolated —OH |
| | 3000–3700 (s, very broad) | no change | Hydrogen bonded —OH |
| | 1705 (vs) | no change | — |
| | 1619 (vs) | no change | adsorbed water |
| None | 3745 (s) | | Isolated —OH (residual) |
| HBr | 3745 (m) | no change | Isolated -OH |
| | 3200–3600 (s, very broad) | further broadened | Hydrogen bonded —OH |
| | 1705 (m) | no change | — |
| | 1618 (vs) | no change | adsorbed water |

The term "3h" stands for 3 hour prior evacuation.

TABLE V

Amount of NO and $SO_3$ Adsorbed at 100 torr for 1 Hour on AP-MgO-on and CP-MgO-on.

| | AP - MgO | | CP - MgO | |
|---|---|---|---|---|
| Gas | per $nm^2$ | mmol per mol MgO | per $nm^2$ | mmol per mol MgO |
| NO | 5.0 | 100 | 2.8 | 33 |
| $SO_3$ | 14.8 | 300 | 22.3 | 264 |

Note: All results are averages of 2 or 3 trials with <10% error.

TABLE VI

IR Bands and Assignments for NO Adsorbed on AP-MgO-3h and CP-MgO-3h

| Band Position and Strength | Effect of 4 hour evacuation | Band Assignment |
|---|---|---|
| AP-MgO-3h | | |
| 2245 (w) | | $N_2O$ weakly adsorbed |
| 1650 (w) | same | bidentate carbonate |
| 1415 (m) | same | Mg—O—N—O plus bidendate carbonate |
| 1380 (m) | same | bidendate carbonate |
| 1265 (w) | increased | methoxy |
| 1240 (m) | same | — |
| 1212 (s) | decreased | bidentate $NO_2$ |
| 1168 (vs) | decreased | Mg—N—0 |
| 1070 (m) | no change | — |
| CP-MgO-3h | | |
| 1510 (m) | same | Mg—O—N—O |
| 1415 (s) | same | Mg—O—N—O plus monodentate carbonate |
| 1380 (sh) | same | bidentate carbonate |
| 1265 (sh) | increased | methoxy |
| 1238 (w) | same | — |
| 1212 (s) | decreased | bidentate $NO_2$ |
| 1170 (vs) | same | Mg—NO |

The term "3h" stands for 3 hour prior evacuation.

TABLE VII

IR Bands and Assignments for $SO_3$ Adsorbed on AP-MgO-3h and CP-MgO-3h.

| Band Position and Strength | Effect of Evacuation | Band Assignment |
|---|---|---|
| AP-MgO-3h | | |
| 1260 (vs) | increased | sulfate |
| 1105 (vs) | increased | sulfate |
| CP-MgO-3h | | |
| 1630 (s) | reduced | bidentate carbonate |
| 1290 (s) | reduced | sulfate |
| 1220 (s) | no change | sulfate |
| 1140 (s, broad) | no change | sulfate |
| 990 | no change | probably sulfate |

The term "3h" stands for 3 hour prior evacuation.

EXAMPLE 3

In this example, three different types of MgO and $Mg(OH)_2$ were used as room temperature adsorbents for 2-chloroethyl ethyl sulfide (2-CEES), a known mimic for mustard gas. The MgO samples used were AP-MgO, CP-MgO and CM-MgO. The AP-MgO and CP-MgO were prepared as described in Example 1; CM-MgO was a commercially purchased magnesium oxide slowly pretreated under a vacuum ($10^{-3}$ torr) to 500° C. over several hours, and maintaining the sample at 500° C. overnight. Similarly, the AP-MG(OH)$_2$ was prepared in accordance with Example 1.

Procedure

Figure 6:
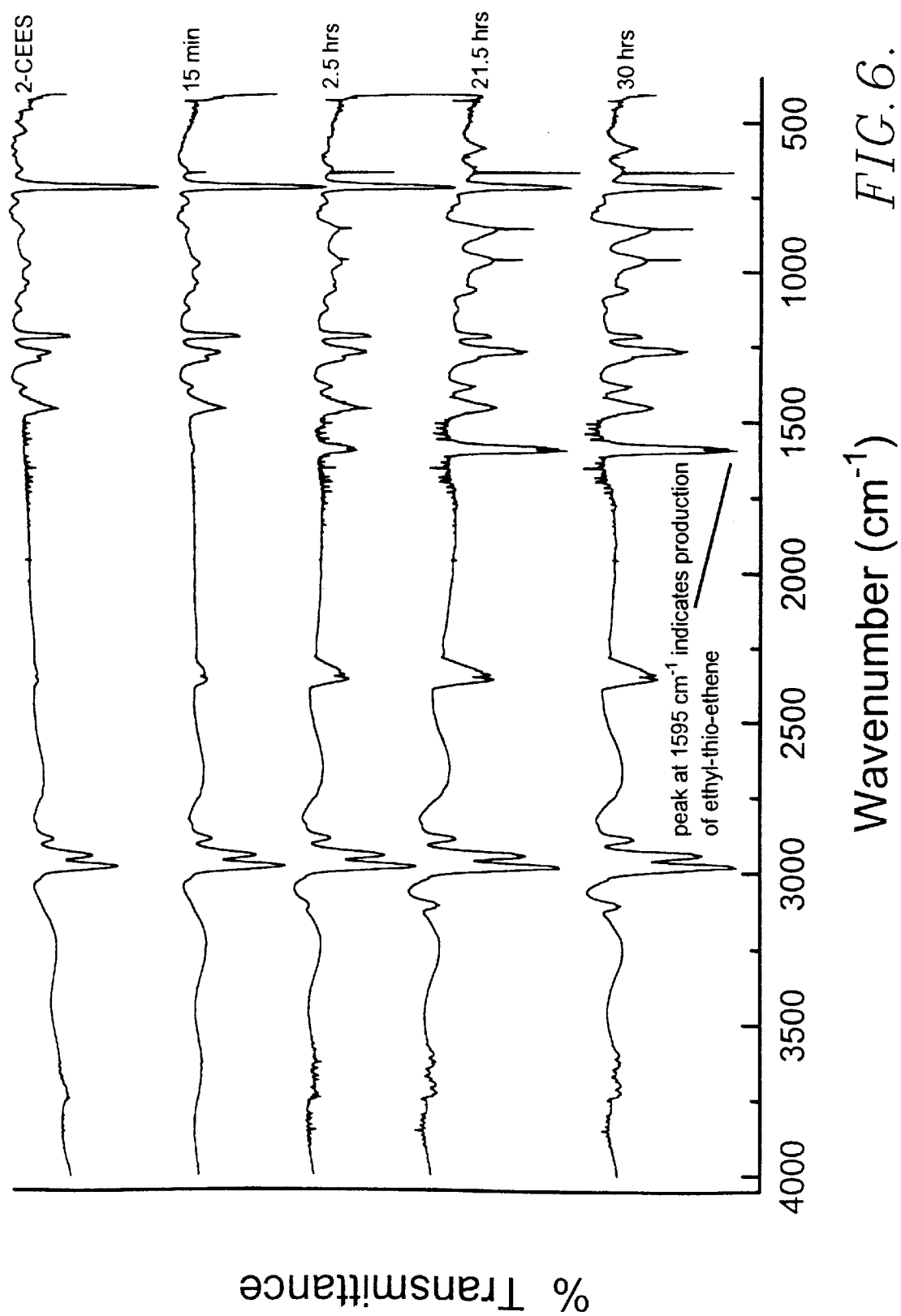
FIG. 6 is a series of IR spectra of unreacted 2-chloroethyl ethyl sulfide (2-CEES) and of the reaction mixture of 2-CEES and AP-MgO, illustrating the production over time of ethyl vinyl sulfide as a measure of the corresponding destructive adsorption of 2-CEES by AP-MgO.

The reaction vessel used for these experiments was a 25 ml round bottom flask with a ground glass neck and a side arm with a stopcock and septum end. Attached to the flask was an infrared gas cell, 25 mm in diameter and a pathlength of 10 cm, with a stopcock allowing the vessel to be evacuated by a vacuum. In the first experiment, solid AP-MgO powder was placed in the bottom of the flask with the side-arm stopcock open and septum on. The entire vessel was evacuated to approximately $10^{-3}$ torr and the top stopcock closed off. At this point, the cell was placed in the spectrometer and a background spectrum was taken. The 2-CEES (14 mL) was then injected through the septum and stopcock hole and the side-arm stopcock was closed to prevent the vacuum from being broken by the hole in the septum. At this point, the 2-CEES became partly vaporized and contacted the MgO, providing ethyl vinyl sulfide. The production of ethyl vinyl sulfide is followed over time by the appearance of an IR peak at 1595 $cm^{-1}$ corresponding to the C=C double bond (FIG. 6).

Figure 7:
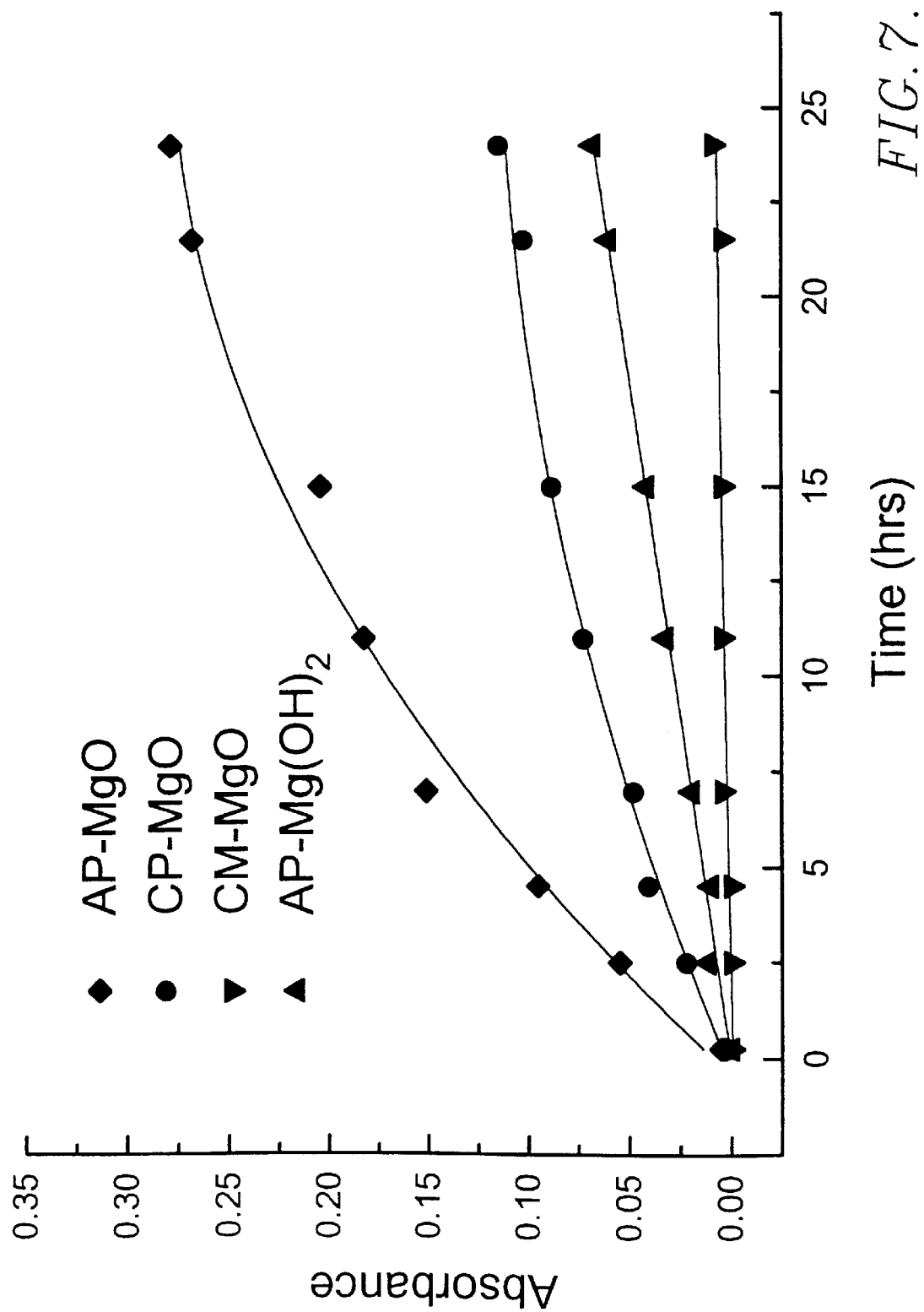
FIG. 7 is a series of FT-IR absorbance graphs of the ethyl vinyl sulfide peak (1595 nm) obtained over time from the reaction products of 2-CEES with AP-MgO, CP-MgO, CM-MgO and AP-Mg(OH)$_2$ demonstrating that AP-MgO produces the most ethyl vinyl sulfide, thus establishing that AP-MgO is the most effective adsorbent.
Figure 8:
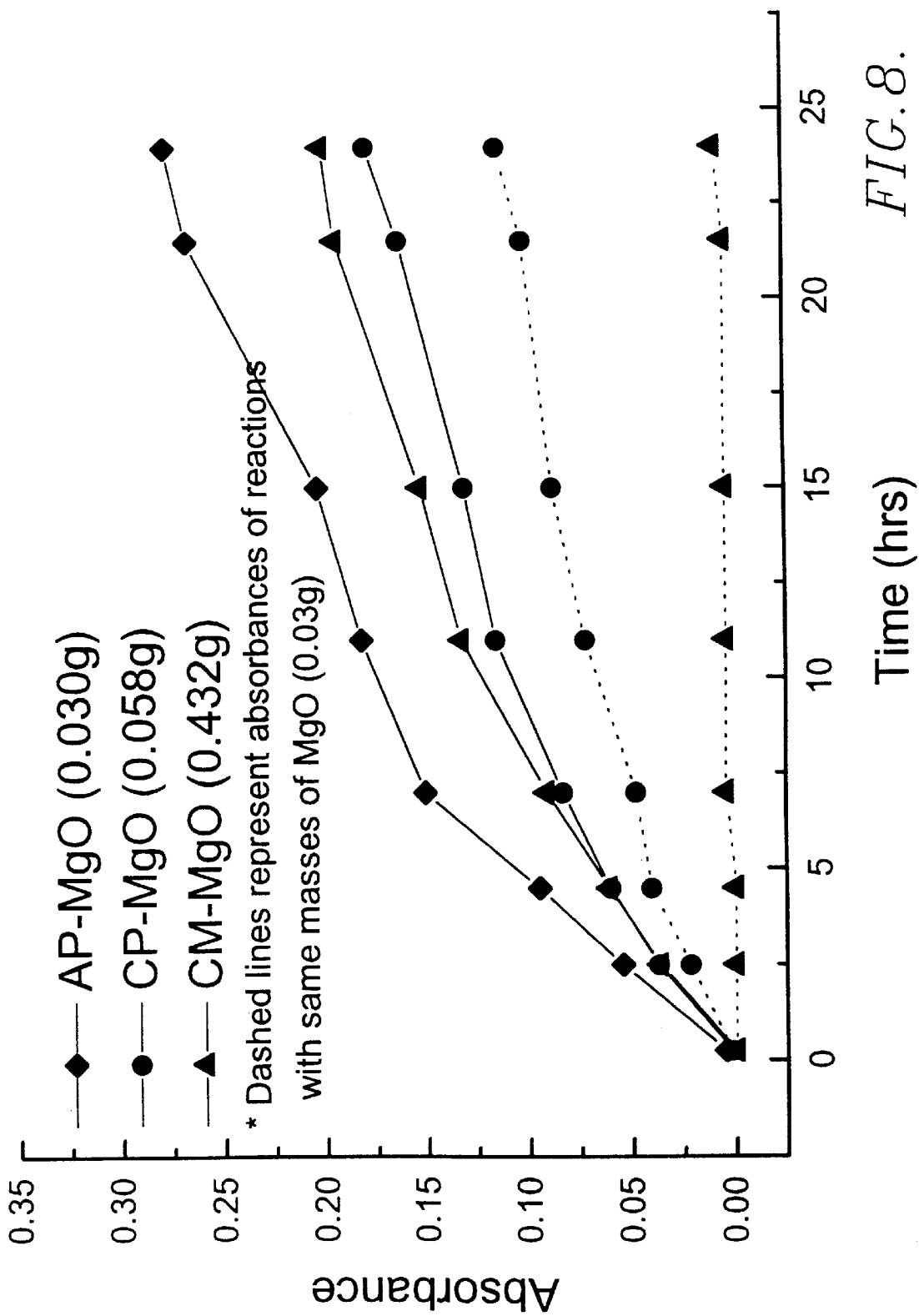
FIG. 8 is a series of FT-IR absorbance graphs of the ethyl vinyl sulfide peak (1595 nm) obtained over time from the reaction products of 2-CEES with AP-MgO, CP-MgO, and CM-MgO at an 8:1 ratio of surface MgO moieties to 2-CEES molecules, demonstrating that the AP-MgO adsorbent has the highest intrinsic adsorbent reactivity for the 2-CEES mustard gas mimic.

Two sets of comparative reactions were then performed. The first reaction used 0.03g of the three different types of MgO and the $Mg(OH)_2$ and showed that the AP-MgO produced the most ethyl vinyl sulfide (FIG. 7). The second set of reactions was designed to investigate the intrinsic reactivity of the three MgO samples by adjusting the masses so that the ratio of surface MgO moieties to 2-CEES is the same (8:1). The AP-MgO was shown to have the highest intrinsic reactivity while the CP-MgO and CM-MgO have approximately the same reactivities (FIG. 8). The increased amount of the ethyl vinyl sulfide vapor observed as the amount of surface MgO moieties increased suggests that most of the ethyl vinyl sulfide is not being adsorbed on the surface of the solid. Thus, increasing absorbance of the 1595 $cm^{-1}$ peaks indicates increasing amounts of ethyl vinyl sulfide produced.

These experiments demonstrated that AP-MgO gave excellent adsorption of the mustard gas mimic, and would therefore be expected to behave similarly with mustard gas and other similar compounds.

EXAMPLE 4

In this example, two nerve gas mimics (diethyl-4-nitrophenylphosphate, known as Paraoxon and dimethylmethylphosphonate, known as DMMP) were adsorbed using AP-MgO as the adsorbent at room temperature.

Figure 9:
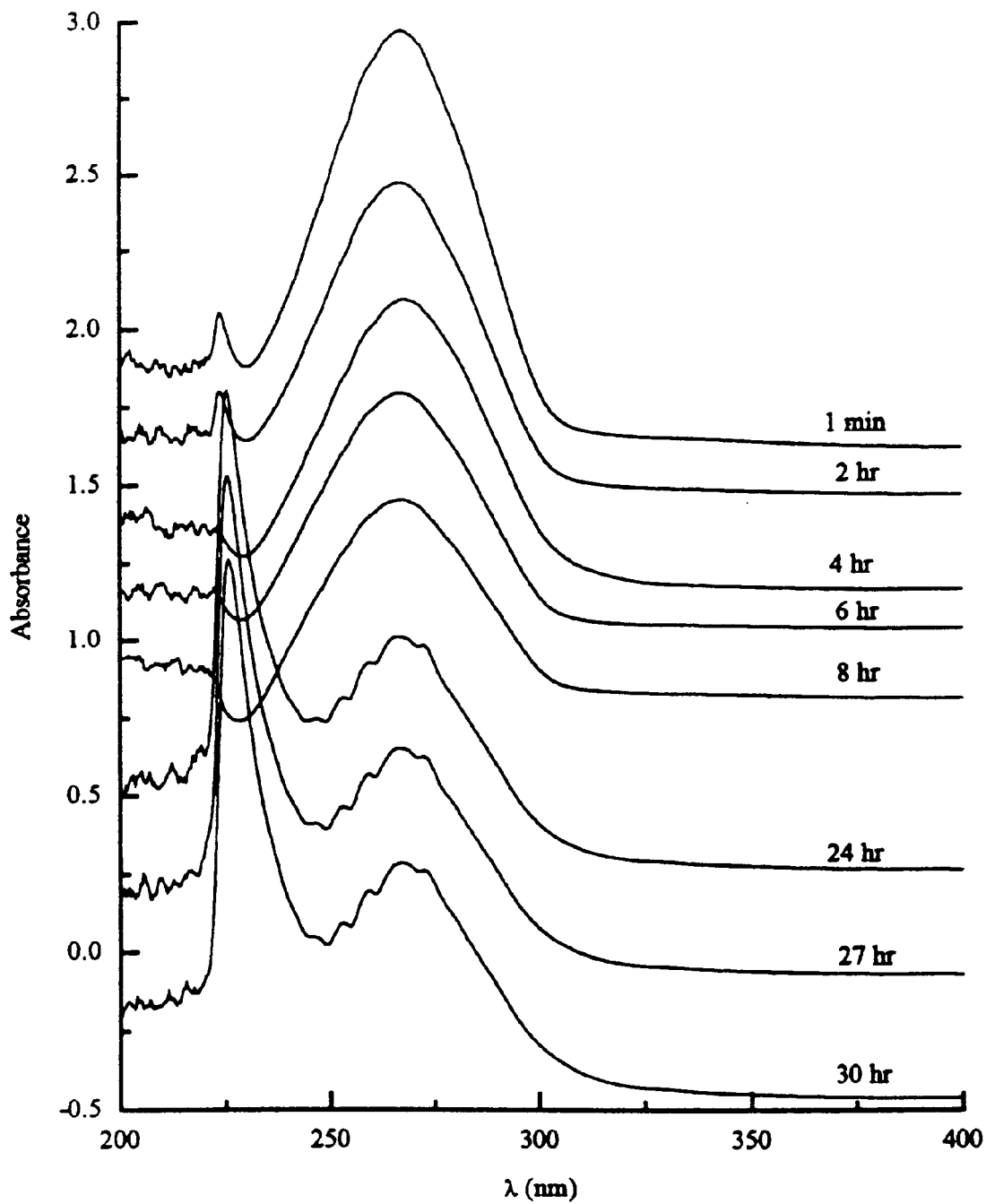
FIG. 9 is a series of UV-V is spectra obtained over a 30-hour room temperature adsorbence reaction period between AP-MgO and Paraoxon (8:1 MgO surface moieties-:Paraoxon molecules), illustrating the decrease in Paraoxon adsorbence over time and the corresponding adsorbence of Paraoxon by AP-MgO.
Figure 10:
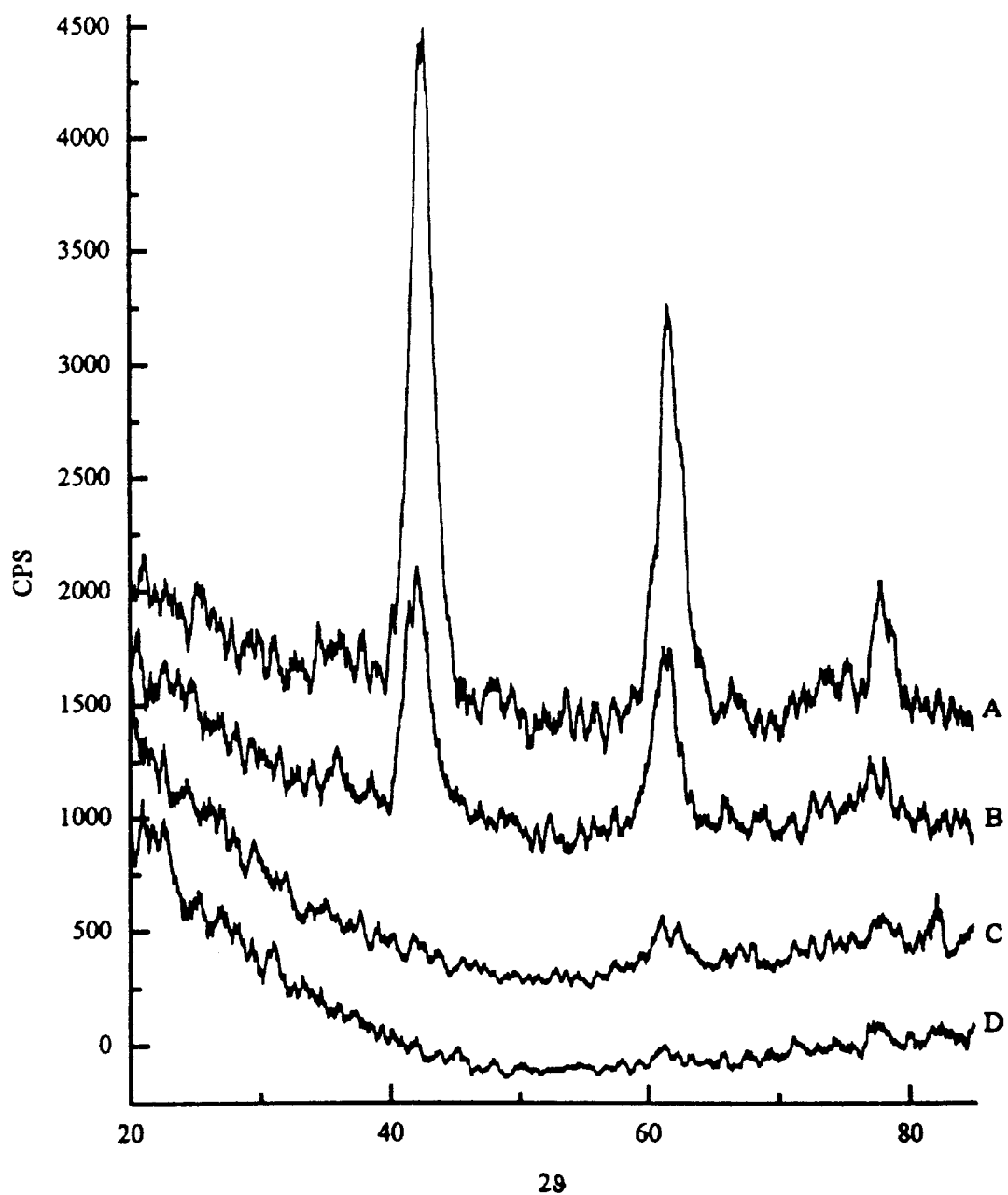
FIG. 10 is a series of X-ray diffraction spectra of reacted AP-MgO and AP-MgO in 100 mL of pentane, THF and toluene after reaction with Paraoxon, demonstrating the decrease in the characteristic AP-MgO peaks.

In each experiment, 0.025 g of AP-MgO produced as described in Example 1 was added to a 25 mL 3-necked round bottom flask equipped with a magnetic stir bar. The flask was sealed with two greased, round glass stoppers and a septum which was then purged with nitrogen for five minutes. After purging, 120 mL of pentane, dried and distilled from Na/K alloy, was added via a syringe while stirring with a magnetic stirrer. While stirring, 72.8 μL of paraoxon was added giving a ratio of 8:1 MgO surface moieties for each molecule of paraoxon. The solution was stirred for one minute after which 2 mL of solution was withdrawn and transferred to a quartz UV-Vis cell after filtering the solution through a syringe filter. The UV-Vis spectrum of the sample was recorded using a Milton Roy Spectronic 3000 array spectrophotometer. This procedure was repeated several times over a 30 hour reaction period. The UV-Vis spectra obtained from this experiment are set forth in FIG. 9, and demonstrate the marked decrease in paraoxon absorbance over time, thereby establishing the adsorbence of this target compound by the AP-MgO In the next series of tests, 8:1 AP-MgO:paraoxon reactions were carried out in 100 mL volumes of pentane, tetrahydrofuran and toluene, and the XRD spectra (Scintag XDS diffractometer using Cu Kα radiation, tube voltage of 40 mV, current of 40 mA, and a scanning speed of 2°/min) of AP-MgO was obtained initially and after the paraoxon reactions in the respective solvents. These XRD spectra are set forth in FIG. 10 and demonstrate that after the paraoxon reaction, the characteristic AP-MgO peaks are substantially lessened.

Figure 11:
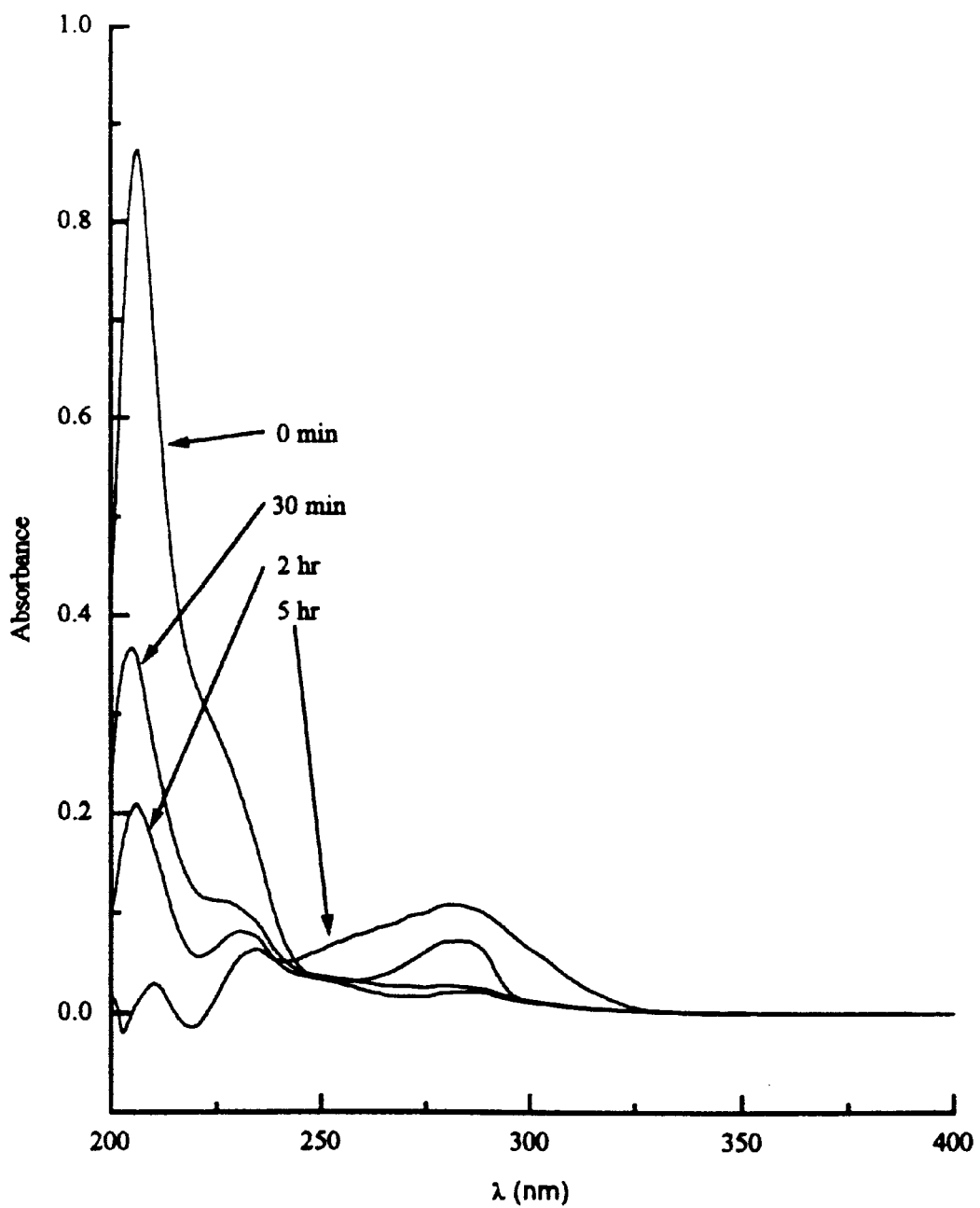
FIG. 11 is a series of UV-V is spectra illustrating the decomposition of DMMP over time from the adsorbence reaction between DMMP and AP-MgO in 20 mL of pentane at room temperature (8:1 MgO moiety:DMMP molecule reactant ratio)
Figure 12:
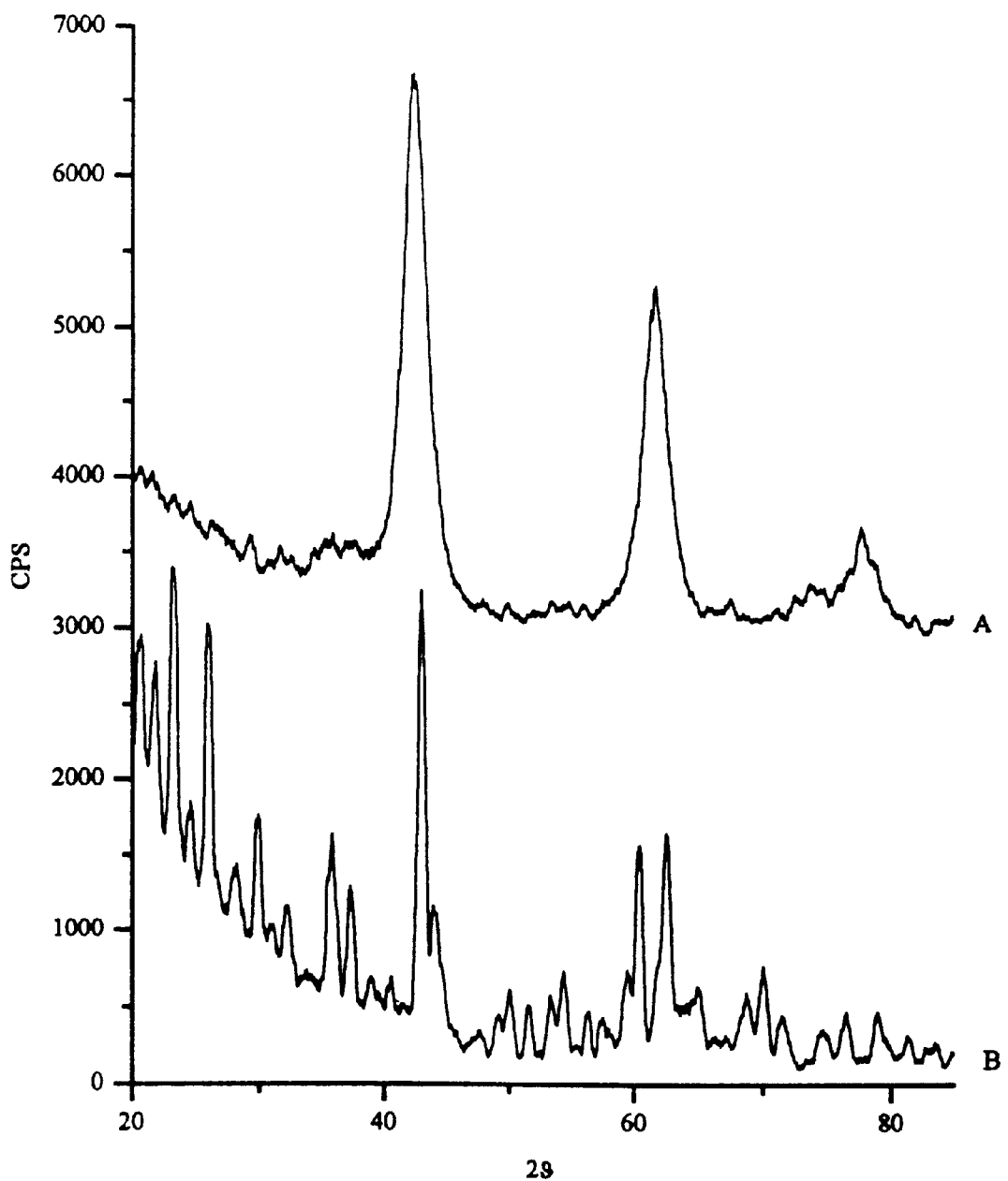
FIG. 12 is a graph illustrating two X-ray diffraction spectra of (A) AP-MgO before reaction (MgO peaks only) and (B) AP-MgO after the adsorbence with DMMP (8:1 MgO moiety:DMMP molecule reactant ratio), confirming the adsorbence of DMMP by AP-MgO.

In another experiment, an 8:1 AP-MgO:DMMP adsorbence reaction was carried out in 20 mL of pentane, with UV-Vis spectra being taken over a five hour period to record the progress of the reaction. These spectra are shown in FIG. 11 and again demonstrate that the DMMP is substantially adsorbed. XRD spectra of the AP-MgO before and after reaction (FIG. 12) further confirm the adsorbence of the DMMP.

EXAMPLE 5

In this example, zirconium oxide nanoparticles were prepared with an acidic dopent/coating, namely sulfuric acid.

A. Preparation of AP-$ZrO_2$.

Zirconium n-propoxide (Alfa Aesar, 70% in n-propanol) and zirconium n-butoxide butanol complex [$Zr(O)Bu)_4$, BuOH] (Alfa Aesar) were used as precursors in the preparation of zirconia aerogels. Dried methanol (Fisher, Spectranalyzed), ethanol (McCormick, dehydrated, absolute—200 proof) and n-propanol (Fisher, Certified) were used as solvents. Nitric acid (Fisher, 70% w/w) was added to catalyze gelation.

The desired amount of distilled water was dissolved in 30 ml of an alcohol. The water concentration was normally adjusted to provide a hydrolysis ratio of four moles of water per mole of zirconium precursor. Appropriate amounts of 70% $HNO^3$ and the precursor were added to the rest of the solvent in another beaker. In the majority of the experiments, the precursor concentration was 0.5 mol/L. The two separate solutions were stirred with a magnetic stir bar for 10 minutes. Then they were quickly mixed under vigorous stirring. Time required for the vortex created by stirring to disappear due to gelation was called the gel time. The stirring was ceased at this moment, and the alcogel was covered and allowed to age at room temperature. Aging time was 2 hours unless otherwise specified.

Aerogels were made by high temperature supercritical drying of the alcogels in a standard one-liter autoclave (Parr). The autoclave with the gel was first flushed with nitrogen for 10 minutes. Then it was filled with nitrogen at an initial pressure of about 100 psi and sealed. The autoclave temperature was slowly increased up to a desired value at a rate of 1 K per minute and maintained at temperature for 10 minutes. The final pressure was about 1200 psi. Total amounts of solvents were adjusted to achieve this pressure (that is above critical) for all the alcohols used. After completion of the procedure, the pressure was quickly released by venting of solvent vapor. The sample was again flushed with nitrogen for 10 minutes and allowed to cool down in nitrogen.

In one specific preparation, 26 ml of zirconium n-butoxide butanol complex were dissolved in 60 ml of ethanol. 2.15 ml of $HNO_3$ were added dropwise under continuous stirring. In another beaker, 3.6 mL of distilled water was dissolved in 30 ml of ethanol. After a 10 minute stirring, the contents of this beaker was quickly added into the first beaker. After the gel was formed and the vortex disappeared, the stirring was turned off, the beaker was covered and the gel was aged for 52 hours at room temperature. Supercritical drying was performed at 255 C. Calcination was performed in open air.

B. Conventionally Prepared (CP-)$ZrO_2$.

$ZrOCl_2 \cdot 8H_2O$ (Alfa Aesar, 99.9% metals basis) was used as a starting material in the preparation of conventional zirconium hydroxide. Thus, 32.2 g of the precursor was dissolved in 200 ml of distilled water. Aqueous ammonium hydroxide (Fisher, 2830 wt %) was added dropwise under continuous stirring up to pH~10. The precipitate was filtered, thoroughly washed with hot distilled water and dried at 120° C. overnight. Conventional and aerogel zirconium oxides were formed by calcining the corresponding hydroxides in the air at 500° C. or other desired temperature for 2 hours in open air.

C. Characterization of $ZrO_2$ Samples.

Textural characterization of the samples was performed on a NOVA 1200 gas sorption analyzer (Quantachrome Corp.). Prior to the analysis, the samples were outgassed at 180° C. for 1 hour. Seven point BET surface areas, total pore volumes and pore size distribution (BJH method) were calculated from 40 point nitrogen adsorption-desorption isotherms.

X-ray powder diffraction experiments were conducted on a Scintag-XDS-2000 spectrometer with Cu Kα radiation. Scans were made in the 2θ range 20–80° with a scanning rate 1° per minute. Particle (i.e., crystallite) sizes were determined from X-ray line broadening using Scherrer's equation. Volume fractions of zirconia tetragonal and monoclinic phases were calculated from integrated peak intensities.

Thermogravimetric analysis (TGA) was performed on a Shimadzu TGA-50 instrument. The samples were heated in platinum crucibles up to 1000° C. with a heating rate of 10° C. per minute in 30 ml/min. dry air flow.

The following table sets forth the properties of AP-$ZrO_2$ aerogels produced by the foregoing methods.

TABLE VIII

Properties of AP-ZrO$_2$ aerogels prepared using different solvents and precursors

| Precursor | Solvent | Gel Time | Surface Area[a], m$^2$/g | Surface Area[b], m$^2$/g | Pore Volume[b], cc/g | Average Pore Radius[b], Å | Particle Size[b], Å | % of Monoclinic Phase[b], % v/v |
|---|---|---|---|---|---|---|---|---|
| Zirconium n-propoxide | Methanol | 55 s | 520 | 81 | 0.5 | 123 | 92 | 17 |
| Zirconium n-propoxide | Ethanol | 45 s | 390 | 105 | 0.73 | 139 | 75 | 29 |
| Zirconium n-propoxide | Propanol | 65 s | 435 | 93 | 0.45 | 97 | 83 | 35 |
| Zirconium n-butoxide | Ethanol | 50 s | 385 | 103 | 0.7 | 136 | 78 | 19 |

[a]After supercritical drying at 255° C.
[b]After calcination at 500° C. in air for 2 hours.

Figure 13:
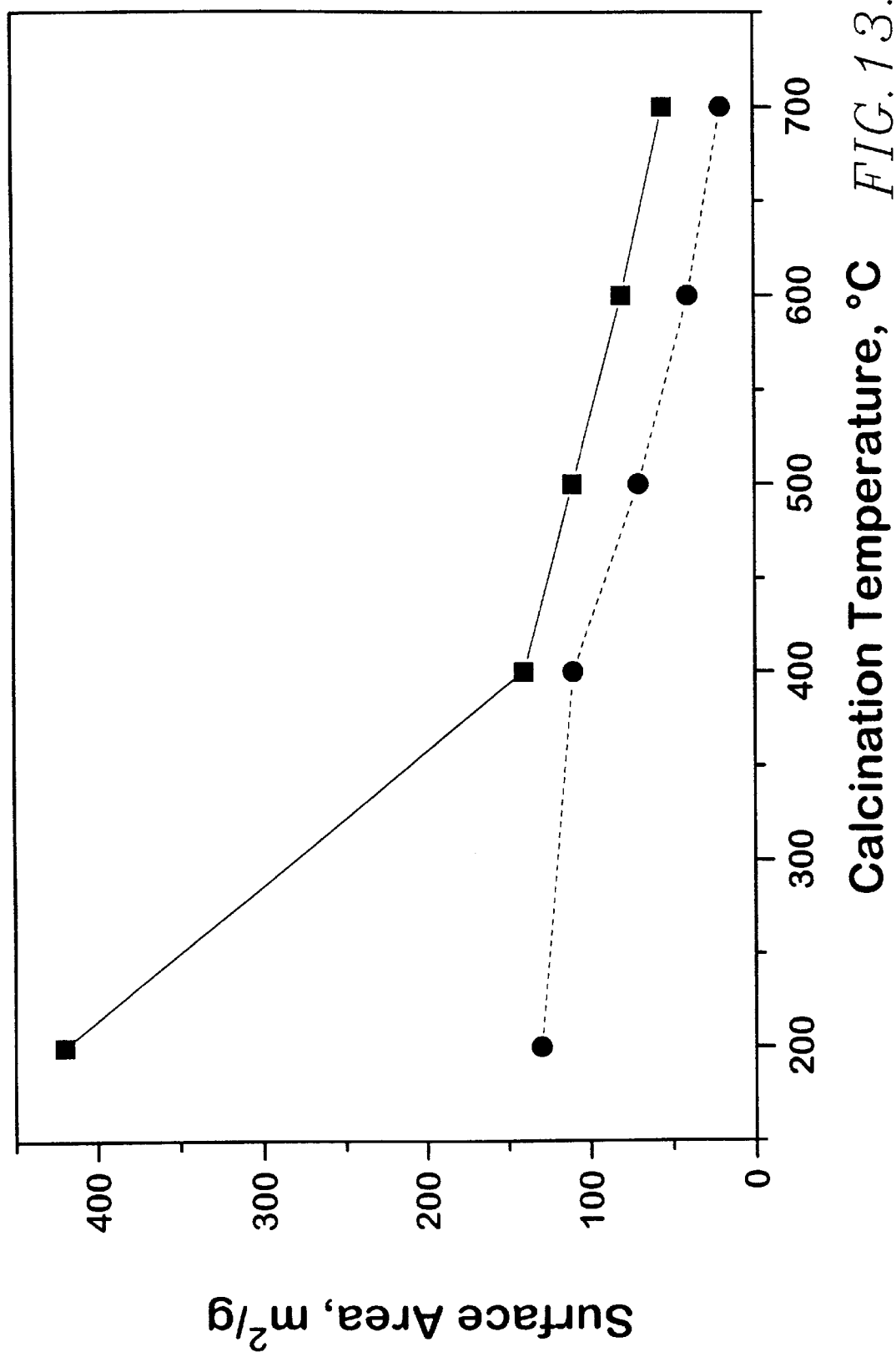
FIG. 13 is a graph illustrating the relationship of surface areas and calcination temperatures in the production of CP-$ZrO_2$ (dashed line) and AP-$ZrO_2$ (solid line)
Figure 14:
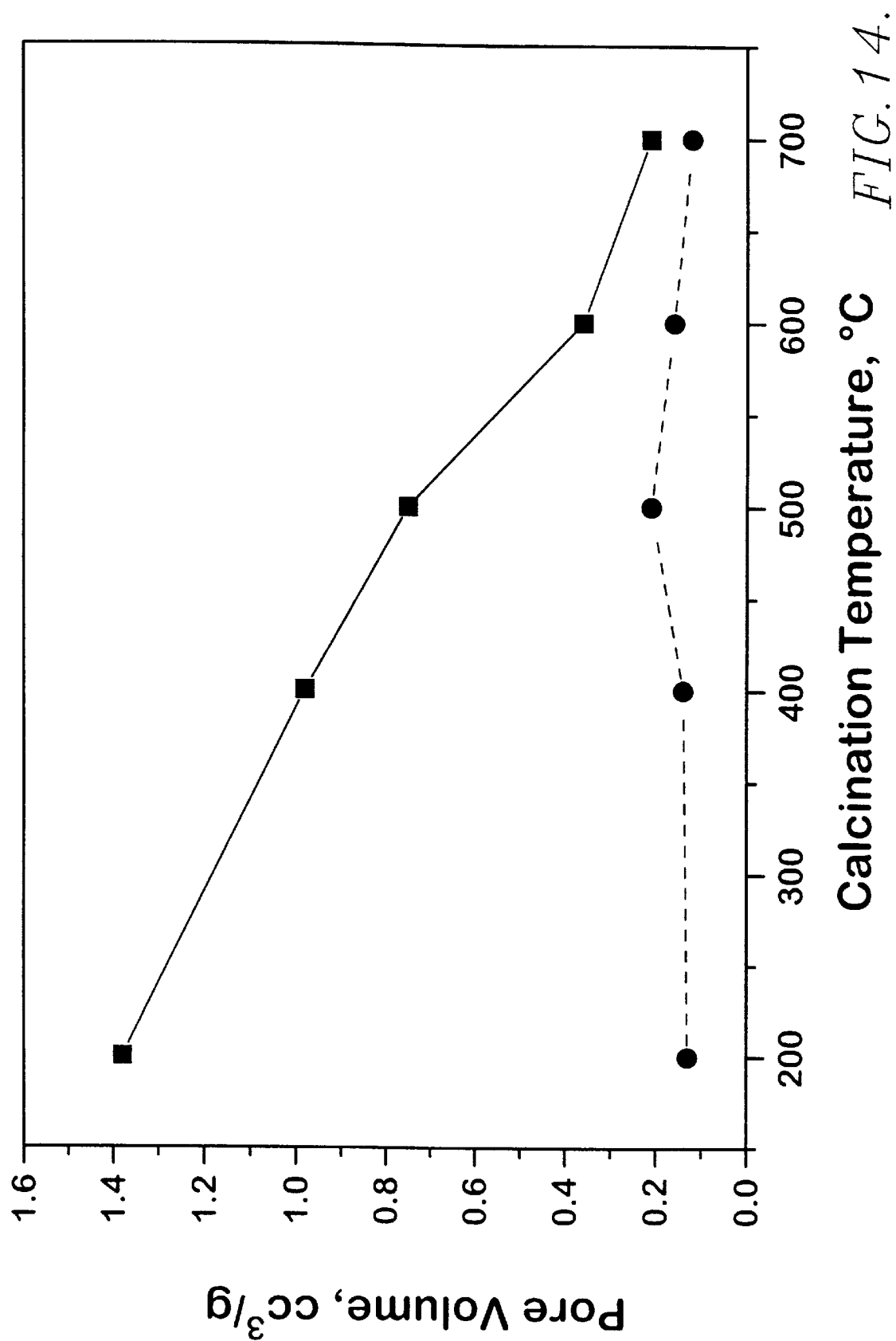
FIG. 14 is a graph illustrating the relationship of pore volumes and calcination temperatures in the production of CP-$ZrO_2$ (dashed line) and AP-$ZrO_2$ (solid line).

The surface areas of the CP-ZrO$_2$ products were generally below 150 m$^2$/g before calcination, and fell to below 50 m$^2$/g after calcination. The surface areas of the AP-ZrO$_2$ products were consistently higher, particularly at lower calcination temperatures (see FIG. 13). The pore volumes of the CP-ZrO$_2$ products ranged from 0.1–0.2 cc/g but were from 1.4–0.2 cc/g for AP-ZrO$_2$ (see FIG. 14).

The addition of sulfuric acid to the CP-ZrO$_2$ and AP-ZrO$_2$ caused the particles to become very strong solid acid catalysts. Catalytic activity for pentane isomerization at room temperature demonstrated that H$_2$SO$_4$-doped AP-ZrO$_2$ exhibited much higher activity as compared with similarly treated CP-ZrO$_2$.

EXAMPLE 6

In this example, the destructive adsorption of CH$_3$CH$_2$SCH$_2$CH$_2$Cl (2-chloroethylethyl sulfide referred to as 2-CEES, a mimic of mustard gas which is ClCH$_2$CH$_2$SCH$_2$CH$_2$Cl) on AP-MgO was carried out. Ratios of surface MgO:2-CEES of 2:1 and 10:1 were used. The AP-MgO was placed in a 25 mL round bottom flash (for masses of MgO used, see Table 1) equipped with a rubber septum. Then 10 μL of 2-CEES was added and the mixture was allowed to stand for 12 hrs. Then 1 mL of pure, freshly distilled tetrahydrofuran (THF) solvent was injected and the mixture stirred for 30 minutes. The solution was filtered through a plug of glass wool.

Quantitative GC analysis was carried out on the THF solution. Under these conditions, 75–90% of the 2-CEES was destroyed, some of which was released upon THF extraction as CH$_3$CH$_2$SCH+CH$_2$.

Infrared studies of the MgO/2-CEES solid before extraction allowed analysis of an IR band at 1266 cm$^{-1}$ indicative of remaining C—Cl bonds. A very small peak, 0.4% intensity, was observed for the 2:1 MgO:2-CEES experiment, and 0.16% for the 10:1 MgO:2-CEES experiment.

TABLE IX

Destruction of 2-CEES on AP-MgO at Room Temperature over 12 Hours

| Mass AP-MgO Used (g) | Ratio of Surface MgO:2-CEES | % 2-CEES Destroyed | Comments |
|---|---|---|---|
| 0.020 | 2:1 | 75% | Trace of undecomposed |
| 0.10 | 10:1 | 90% | remained on surface. Substantial CH$_3$CH$_2$SCH=CH$_2$ released |

This experiment confirmed that nanoscale AP-MgO destroys 2-CEES effectively at room temperature. In contrast, normal commercially available MgO samples are much less effective.

EXAMPLE 7

In these tests, AP-MgO was placed in a flask and the appropriate amount of paraoxon (diethyl-4-nitrophenylphosphate) was injected. Three types of experiments were carried out: (1) 0.1 g of AP-MgO and 4.5 μL of paraoxon, no stirring; (2) 0.5 g of AP-MgO and 22.5 μL of paraoxon, no stirring; and (3) 0.5 g of AP-MgO and 22.5 μL of paraoxon, with stirring. The reaction was carried out for 2, 5 and 20 hours (in total reactions). After each reaction time, 5 mL of dry methanol was added to the powder to desorb surface species. Then, the solvent was filtered off and studied by gas-chromatography mass spectrometry (GC-MS). The areas under the peaks corresponding to paraoxon (starting material) and p-nitrophenol (decomposition product) were measured and compared to the references (4.5 μL of paraoxon in methanol and 22.5 μL of paraoxon in methanol). The results are given in Table XI, which shows intensity of paraoxon after 2, 6 and 20 hours. As can be seen, stirring of the sample had a positive effect on the decomposition efficiency. Observation shows that with stirring there is a significant color change from light brown to a bright yellow. Without stirring, this color change is only visible on or near the paraoxon drops. When the same reaction was carried out in a solvent (pentane) the complete adsorption/decomposition of paraoxon was almost an instantaneous process.

TABLE X

Intensity/disappearance of paraoxon during reaction with AP-MgO (354 m²/g).
Zero means that paraoxon cannot be extracted from the surface.

| Time of Reaction | % of remaining paraoxon (0.1 g of AP-MgO 4.5 μL paraoxon no stirring) | % of remaining paraoxon (0.5 g of AP-MgO 22.5 μL paraoxon no stirring) | % of remaining paraoxon (0.5 g of AP-MgO 22.5 μL paraoxon with stirring) |
|---|---|---|---|
| 2 hrs | 40% | 49% | 7.6% |
| 6 hrs | 12% | 24% | 0% |
| 20 hrs | 5.0% | 6.7% | 0% |

The intensity of p-nitrophenol (a decomposition product) was measured in these experiments (see Table XI). In the starting compound (paraoxon), there is normally about 15% of p-nitrophenol. (The percentages are based on the amount of p-nitrophenol present in the starting compound.) The p-nitrophenol is adsorbed on the surface along with paraoxon. In some cases more p-nitrophenol was seen with extended reaction times. This could be due to two factors, i.e., more paraoxon was decomposed, (therefore more p-nitrophenol was formed), and with longer exposure time to the atmosphere, there may be a competing reaction between hydroxyl groups and the product.

TABLE XI

Intensity of p-nitrophenol during reaction of paraoxon with AP-MgO (354 m²/g)

| Time of Reaction | % of generated p-nitrophenol (0.1 g of AP-MgO 4.5 μL paraoxon no stirring) | % of generated p-nitrophenol (0.5 g of AP-MgO 22.5 μL paraoxon no stirring) | % of generated p-nitrophenol (0.5 g of AP-MgO 22.5 μL paraoxon no stirring) |
|---|---|---|---|
| 2 hrs | 62% | 124% | 23% |
| 6 hrs | 7.5% | 7.9% | 64% |
| 20 hrs | 470% | 6.7% | traces |

TABLE XII

Adsorpotion of Sulfur Dioxide on AP-MgO

| Pressure | Physisorbed $SO_2$ #$SO_2$/nm² | Chemisorbed $SO_2$ #$SO_2$/nm² |
|---|---|---|
| 760 Torr (pure $SO_2$) | 7.5 ± 2 | 4.6 ± 1 |
| 800 torr (400 Torr of $SO_2$ and 400 Torr of $N_2$) | 7.6 ± 1 | 3.9 ± 1 |

EXAMPLE 9

In this example, the adsorption of sulfur dioxide on AP-MgO at room temperature was studied. Prior to the experiment, AP-Mg(OH)$_2$ was pressed into a pellet and then broken into small uniform pieces. The hydroxide was activated overnight under vacuum at 500° C., and just before the adsorption experiments was cooled to room temperature. The AP-MgO was placed in a vessel attached to a calibrated quartz spring balance.

Sulfur dioxide was added to the vessel and allowed to react for 15 minutes at atmospheric pressure (760 Torr). The amount of adsorbed gas was measured, based on the change in the length of the spring. The system was then evacuated for 100 minutes to remove physisorbed $SO_2$ and final readings were taken. Similar experiments were conducted using a pressure of 800 Torr (400 Torr of $SO^2$ and 400 Torr of nitrogen gas). Results of the physisorbed and chemisorbed/reacted $SO^2$ are given as a number of molecules per nm$^{2,}$ as shown in Table XII.

As can be seen, autoclaved magnesium oxide adsorbs sulfur dioxide at atmospheric and above atmospheric pressure. Upon evacuation, some of the gas is removed, but some still stays on the surface, as chemisorbed/reacted $SO_2$.

I claim:

1. A method of adsorbing a target compound comprising the steps of:
   providing a quantity of finely divided adsorbent selected from the group consisting of MgO, CaO, $TiO_2$, $ZrO_2$, $Fe_2O_3$, NiO, $Al_2O_3$, ZnO and mixtures thereof, said adsorbent having an average particle size of from about 1–20 nm; and
   contacting said adsorbent with a target compound selected from the group consisting of $C_6H_3(OH)(NO_2)_3$, $C_6H_5(Br)(CN)$, $C_6H_5CH_2CN$, $(CF_3)C=CF_2$, HCN, $P(O)(OCH_2CH_3)(CN)(N(CH_3)_2)$, ClCN, $(CF_3)C=CF_2$, $Zn(CH_2CH_3)_2$, $Hg(CH_3)_2$, $Fe(CO)_5$, $(P)(O)(CH_3)(F)$, $S(CH_2CH_2Cl)_2$, $C_6H_5C(O)CH_2Cl$, $C(O)Cl_2$, and $C_6Cl_5OH$ under conditions for adsorbing at least a portion of said target compound,
   said contacting step being carried out at a temperature of from about −70 to 90° C. and a pressure of atmospheric and above,
   said contacting step causing the destruction adsorption or chemisorption of said target compound, said target compound having bonds which are broken during said contacting step.

2. The method of claim 1, said temperature being from about −40 to 70° C.

3. The method of claim 1, said adsorbent having a surface area of at least about 30 m$^2$/g.

4. The method of claim 3, wherein said surface area is from about 50–700 m$^2$/g.

5. The method of claim 4, wherein said surface area is from about 250–600 m$^2$/g.

6. The method of claim 1, said adsorbent having a total pore volume of at least about 0.5 cc/g.

7. The method of claim 6, said total pore volume being from about 0.55–1.5 cc/g.

8. The method of claim 1, said adsorbent being MgO and having an average pore diameter of at least about 70 Å.

9. The method of claim 8, said average pore diameter being from about 80–110 Å.

10. The method of claim 1, said adsorbent being CaO and having an average pore diameter of at least about 175 Å.

11. The method of claim 1, said pore diameter being from about 200–250 Å.

12. The method of claim 1, said particle size being from about 2–15 nm.

13. The method of claim 1, said adsorbent having an edge to surface ion ratio of at least about 5%.

14. The method of claim 13, said ratio being from about 10–30%.

15. The method of claim 1, said target compound being in the form of a gas.

16. The method of claim 1, said target compound being in the form of a liquid.

17. The method of claim 1, said contacting step being carried out by passing a fluid containing said target compound through an enclosed chamber, said chamber having therein a bed of said finely divided adsorbent material.

18. The method of claim 1, said contacting step being carried out by dispersing said quantity of adsorbent onto a surface containing said target compound.

19. The method of claim 1, said contacting step being carried out by dispersing said adsorbent into an atmosphere containing said target compounds.

20. A method of destructively adsorbing an acid from a gas stream, comprising the steps of:

providing a gas stream including therein an acid selected from the group consisting of $C_6H_3(OH)(NO_2)_3$, $C_6H_5(Br)(CN)$, $C_6H_5CH_2CN$, $(CF_3)C=CF_2$, HCN, $P(O)(OCH_2CH_3)(CN)(N(CH_3)_2)$, ClCN, $(CF_3)_2C=CF_2$, $Zn(CH_2CH_3)_2$, $Hg(CH_3)_2$, $Fe(CO)_5$, $(P)(O)(CH_3)(F)$, $S(CH_3CH_2Cl)_2$, $C_6H_5C(O)CH_2Cl$, $C(O)Cl_2$ and $C_6Cl_5OH$ under conditions for adsorbing at least a portion of said target compound, to be adsorbed;

contacting said gas stream with a quantity of finely divided adsorbent selected from the group consisting of MgO, CaO, TiO$_2$, ZrO$_2$, Fe$_2$O$_3$, NiO, Al$_2$O$_3$, ZnO and mixtures thereof, said adsorbent having an average particle size of from about 1–20 nm; and destructively adsorbing said acid from said gas stream;

wherein said contacting step is carried out at a temperature of from about −70 to 90° C. during said contacting step.

21. The method of claim 20, said adsorbent having a surface area of at least about 30 m$^2$/g.

22. The method of claim 21, wherein said surface area is from about 50–700 m$^2$/g.

23. The method of claim 22, wherein said surface area is from about 250–600 m$^2$/g.

24. The method of claim 20, said adsorbent having a total pore volume of at least about 0.5 cc/g.

25. The method of claim 24, said total pore volume being from about 0.55–1.5 cc/g.

26. The method of claim 20, said adsorbent being MgO and having an average pore diameter of at least about 70 Å.

27. The method of claim 26, said average pore diameter being from about 80–110 Å.

28. The method of claim 20, said adsorbent being CaO and having an average pore diameter of at least about 175 Å.

29. The method of claim 28, said pore diameter being from about 200–250 Å.

30. The method of claim 20, said particle size being from about 2–15 nm.

31. The method of claim 20, said adsorbent having an edge to surface ion ratio of at least about 5%.

32. The method of claim 31, said ratio being from about 10–30%.

33. The method of claim 20, said target compound being in the form of a gas.

34. The method of claim 20, said target compound being in the form of a liquid.

35. A method of decontaminating solid surfaces exposed to a contaminating target compound selected from the group consisting of $C_6H_3(OH)(NO_2)_3$, $C_6H_5(Br)(CN)$, $C_6H_5CH_2CN$, $(CF_3)C=CF_2$, HCN $P(O)(OCH_2CH_3)(CN)(N(CH_3)_2)$, ClCN, $(CF_3)_2C=CF_2$, $Zn(CH_2CH_3)_2$, $Hg(CH_3)_2$, $Fe(CO)_5$, $(P)(O)(CH_3)(F)$, $S(CH_2CH_2Cl)_2$, $C_6H_5C(O)CH_2Cl$, and $C(O)Cl_2$ and $C_6Cl_5OH$ comprising the steps of:

providing a quantity of finely divided adsorbent selected from the group consisting of MgO, CaO, TiO$_2$, ZrO$_2$, Fe$_2$O$_3$, NiO, Al$_2$O$_3$, ZnO and mixtures thereof, said adsorbed having an average particle size of from about 1–20 nm;

spreading said finely divided adsorbent onto said solid surfaces, and causing the adsorbent to contact said target contaminating compound for destructive adsorption of the target contaminating compound wherein the contact between the target contaminating compound and the adsorbent is carried out at a temperature of from about −70 to 90° C. during said contacting step.

36. The method of claim 35, including the step of collecting said adsorbent after said contacting step.

37. The method of claim 35, said adsorbent having an agglomerate size of at least 0.1 mm.

38. The method of claim 35, including the step of carrying out said spreading and contacting steps at a pressure of substantially atmospheric and above.

39. The method of claim 35, said adsorbent having a surface area of at least about 30 m$^2$l/g.

40. The method of claim 39, said particle size being from about 2–15 nm.

41. The method of claim 35, said adsorbent having a total pore volume of at least about 0.5 cc/g.

42. The method of claim 35, said adsorbent being MgO and having an average pore diameter of at least about 70 Å.

43. The method of claim 35, said adsorbent being CaO and having an average pore diameter of at least about 175 Å.

* * * * *

UNITED STATES PATENT AND TRADEMARK OFFICE
CERTIFICATE OF CORRECTION

PATENT NO. : 5,990,373  
DATED : November 23, 1999  
INVENTOR(S) : Kenneth J. Klabunde It is certified that error appears in the above-identified patent and that said Letters Patent is hereby corrected as shown below:

<u>Column 1,</u>  
Line 10, please delete "DAAH04-93-G-0328" and substitute therefor -- DAAG-55-97-0036 --.

Signed and Sealed this

Thirtieth Day of April, 2002

Attest:

Attesting Officer

JAMES E. ROGAN  
Director of the United States Patent and Trademark Office

UNITED STATES PATENT AND TRADEMARK OFFICE
CERTIFICATE OF CORRECTION

PATENT NO. : 5,990,373  
DATED : November 23, 1999  
INVENTOR(S) : Kenneth J. Klabunde Page 1 of 1

It is certified that error appears in the above-identified patent and that said Letters Patent is hereby corrected as shown below:

Column 24,
Line 57, please delete "(P)(O)(CH$_3$)(F)" and substitute therefor
-- (P)(O)(CH$_3$)(F)[OCH(CH$_3$)$_2$] --

Column 25,
Line 47, please delete "(P)(O)(CH$_3$)(F)" and substitute therefor
-- (P)(O)(CH$_3$)(F)[OCH(CH$_3$)$_2$] --

Column 26,
Line 30, please delete "(P)(O)(CH$_3$)(F)" and substitute therefor
-- (P)(O)(CH$_3$)(F)[OCH(CH$_3$)$_2$] --

Signed and Sealed this

Eleventh Day of March, 2003

JAMES E. ROGAN  
*Director of the United States Patent and Trademark Office*